United States Patent
Tanaka et al.

(10) Patent No.: US 10,939,058 B2
(45) Date of Patent: Mar. 2, 2021

(54) IMAGE PROCESSING APPARATUS, IMAGE PROCESSING METHOD, AND PROGRAM

(71) Applicant: FUJIFILM Corporation, Tokyo (JP)

(72) Inventors: Koichi Tanaka, Saitama (JP); Seiji Tanaka, Saitama (JP); Makoto Kobayashi, Saitama (JP); Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/563,451

(22) Filed: Sep. 6, 2019

(65) Prior Publication Data
US 2020/0007799 A1    Jan. 2, 2020

Related U.S. Application Data

(63) Continuation of application No. PCT/JP2018/012108, filed on Mar. 26, 2018.

(30) Foreign Application Priority Data

Mar. 30, 2017  (JP) ................................. 2017-068558

(51) Int. Cl.
   *H04N 5/353*  (2011.01)
   *H04N 5/369*  (2011.01)
   (Continued)

(52) U.S. Cl.
   CPC ..... *H04N 5/3532* (2013.01); *H04N 5/232122* (2018.08); *H04N 5/35563* (2013.01); *H04N 5/36961* (2018.08)

(58) Field of Classification Search
   CPC ............. H04N 5/3532; H04N 5/36961; H04N 5/232122; H04N 5/35563; H04N 5/23293;
   (Continued)

(56) References Cited

U.S. PATENT DOCUMENTS

2009/0147110 A1* 6/2009 Muramatsu .......... H04N 5/3572
                                                        348/255
2013/0002911 A1    1/2013 Miyashita et al.
                       (Continued)

FOREIGN PATENT DOCUMENTS

CN    101075815 A    11/2007
CN    105008976 A    11/2007
                       (Continued)

OTHER PUBLICATIONS

International Preliminary Report on Patentability and Written Opinion of the International Searching Authority, dated Oct. 10, 2019, for International Application No. PCT/JP2018/012108, with a Written Opinion translation.

(Continued)

*Primary Examiner* — Mekonnen D Dagnew
(74) *Attorney, Agent, or Firm* — Birch, Stewart, Kolasch & Birch, LLP

(57) ABSTRACT

An object of the present invention is to provide an image processing apparatus, an image processing method, and a program capable of interpolating a gain of a pixel value of a phase difference detection pixel using a gain value even in the case of generating a display image requiring a real-time property. An image processing apparatus (60) sequentially obtains each frame image in time series order of a motion picture and calculates a gain value to be used in gain interpolation of a pixel value of a phase difference detection pixel of a current frame image based on a past frame image obtained in the time series order. The image processing apparatus (60) interpolates the pixel value of the phase difference detection pixel of the current frame image using the gain value.

15 Claims, 19 Drawing Sheets

(51) Int. Cl.
*H04N 5/232* (2006.01)
*H04N 5/355* (2011.01)

(58) Field of Classification Search
CPC ........ H04N 5/243; H04N 5/3653; G02B 7/34; G03B 13/36
See application file for complete search history.

(56) References Cited

U.S. PATENT DOCUMENTS

| | | |
|---|---|---|
| 2013/0120609 A1 | 5/2013 | Okazawa |
| 2014/0028881 A1 | 1/2014 | Miyatani et al. |
| 2014/0267839 A1* | 9/2014 | Nishimaki ........... H04N 5/3696 348/246 |
| 2016/0014327 A1 | 1/2016 | Iwasaki |

FOREIGN PATENT DOCUMENTS

| | | |
|---|---|---|
| CN | 101971610 A | 2/2011 |
| CN | 102947881 A | 2/2013 |
| CN | 104041009 A | 9/2014 |
| CN | 104813648 A | 7/2015 |
| JP | 2012-4729 A | 1/2012 |
| JP | 2016-76998 A | 1/2012 |
| JP | 2014-26062 A | 2/2014 |
| JP | 2014-180000 A | 9/2014 |

OTHER PUBLICATIONS

International Search Report, dated Jun. 12, 2018, for International Application No. PCT/JP2018/012108, with an English translation.
Chinese Office Action and Search Report for Chinese Application No. 201880020590.0, dated Jul. 27, 2020, with English translation.

* cited by examiner

IMAGE PROCESSING APPARATUS, IMAGE PROCESSING METHOD, AND PROGRAM

CROSS-REFERENCE TO RELATED APPLICATIONS

The present application is a Continuation of PCT International Application No. PCT/JP2018/012108 filed on Mar. 26, 2018 claiming priority under 35 U.S.C § 119(a) to Japanese Patent Application No. 2017-068558 filed on Mar. 30, 2017. Each of the above applications is hereby expressly incorporated by reference, in its entirety, into the present application.

BACKGROUND OF THE INVENTION

1. Field of the Invention

The present invention relates to an image processing apparatus, an image processing method, and a program and particularly, to a technology for interpolating a pixel value output from a phase difference detection pixel.

2. Description of the Related Art

In the related art, an imaging apparatus that achieves focus using on-sensor phase difference auto focus (AF) technology is known. The imaging apparatus achieving focus using plane phase difference AF technology comprises an imaging element in which phase difference detection pixels are discretely arranged along with normal pixels.

The phase difference detection pixel has a smaller area of a light shielding film opening than the normal pixel. Thus, in the case of generating an image based on an output value of the phase difference detection pixel, it is necessary to correct and use a pixel value of the phase difference detection pixel. Therefore, a technology related to the correction of the pixel value of the phase difference detection pixel is suggested.

For example, in the disclosure of JP2016-076998A, in an imaging apparatus in which a lens device can be attached and detached, a method of correcting output signals of all phase difference detection pixels by a gain correction process is selected in a case where a correction gain value that corresponds to a lens identification (ID) included in lens information obtained from the lens device is present. In a case where the correction gain value corresponding to the lens ID is not present, a method of correcting the output signals of all phase difference detection pixels by an interpolation correction process is selected. The interpolation correction process is correction by replacing an output signal (pixel value) of a correction target pixel with a signal that is generated using an output signal of an imaging pixel detecting the same color as the correction target pixel in the surrounding area of the correction target pixel.

In addition, for example, JP2014-180000A discloses a technology for performing a correction process in an imaging element including phase difference detection pixels and normal pixels by changing a weight coefficient of pixel data of gain-adjusted phase difference detection pixels depending on a mixing ratio of the pixel data of the phase difference detection pixels.

SUMMARY OF THE INVENTION

Representative methods of interpolating the pixel value of the phase difference detection pixel include average value interpolation (surrounding pixel interpolation) and gain interpolation.

The average value interpolation is a method of performing interpolation using a weighted average value of pixel values of a plurality of normal pixels in the surrounding area of the phase difference detection pixel subjected to the interpolation. In order to improve the accuracy of phase difference detection, it is necessary to arrange the phase difference detection pixels at high density. However, in a case where the density of the pixel difference detection pixels is increased, the number of normal pixels used in calculation of the weighted average value is decreased. Thus, the accuracy of the average value interpolation is decreased.

The gain interpolation is an interpolation method of setting the pixel value of the phase difference detection pixel to have the same signal level as the pixel value of the surrounding normal pixel by multiplying the pixel value of the phase difference detection pixel by a gain value. The pixel value of the phase difference detection pixel varies depending on the F-number, a defocus amount, and the like. Thus, it is difficult to calculate the gain value in advance with high accuracy. It is necessary to calculate a signal ratio (=gain value) of the phase difference detection pixel and the normal pixel by actually analyzing RAW data to be corrected. However, there is no time to calculate the gain value in generation of a display image of a live view such as a motion picture for which it is necessary to display a captured image immediately after a subject is imaged (requires a real-time property).

Even in the case of generating the display image requiring the real-time property, by performing the gain interpolation, the interpolation of the pixel value of the phase difference detection pixel with high accuracy can be implemented with respect to image data from the imaging element in which the phase difference detection pixels are arranged at high density.

In JP2016-076998A and JP2014-180000A, the gain interpolation of the pixel value of the phase difference detection pixel in the case of generating the display image requiring the real-time property is not mentioned.

The present invention is conceived in view of such matters. An object of the present invention is to provide an image processing apparatus, an image processing method, and a program capable of interpolating a gain of a pixel value of a phase difference detection pixel using a gain value even in the case of generating a display image requiring a real-time property.

In order to achieve the object, an image processing apparatus that is one aspect of the present invention comprises an imaging element in which a plurality of phase difference detection pixels and a plurality of normal pixels are two-dimensionally arranged, an image obtaining unit that sequentially obtains each frame image in time series order of the motion picture from the imaging element during imaging of the motion picture, the frame image having pixel values of the plurality of phase difference detection pixels and pixel values of the plurality of normal pixels, a gain value calculation unit that calculates a gain value to be used in gain interpolation of the pixel value of the phase difference detection pixel of a current frame image based on a past frame image in the time series order obtained by the image obtaining unit, a first gain interpolation unit that interpolates the pixel value of the phase difference detection pixel of the current frame image using the gain value, and a display image generation unit that generates a display image of the current frame image based on the pixel value of the phase difference detection pixel of the current frame image interpolated by the first gain interpolation unit and the pixel value of the normal pixel.

According to the present aspect, the gain value to be used in the gain interpolation of the pixel value of the phase difference detection pixel of the current frame image is calculated based on the past frame image in the time series order. The pixel value of the phase difference detection pixel of the current frame image is interpolated using the calculated gain value. Accordingly, in the present aspect, the gain interpolation of the pixel value of the phase difference detection pixel can be performed even in the case of generating the display image requiring a real-time property. Thus, the display image having a favorable image quality can be generated.

It is preferable that the image processing apparatus further comprises a surrounding pixel value calculation unit that calculates a surrounding pixel value based on the pixel value of the normal pixel in a surrounding region of the phase difference detection pixel of the current frame image, and a surrounding pixel interpolation unit that interpolates the pixel value of the phase difference detection pixel of the current frame image using the surrounding pixel value.

According to the present aspect, the surrounding pixel value is calculated based on the pixel value of the normal pixel in the surrounding region of the phase difference detection pixel of the current frame image. The pixel value of the phase difference detection pixel of the current frame image is interpolated using the calculated surrounding pixel value. Accordingly, in the present aspect, not only the gain interpolation but also surrounding pixel interpolation can be performed on the pixel value of the phase difference detection pixel of the current frame. Thus, the display image having a favorable image quality can be generated.

It is preferable that the image processing apparatus further comprises an interpolation control unit that controls operation of the first gain interpolation unit and the surrounding pixel interpolation unit, and the interpolation control unit causes the first gain interpolation unit to perform the interpolation in a case where the gain value calculation unit calculates the gain value, and causes the surrounding pixel interpolation unit to perform the interpolation in a case where the gain value calculation unit does not calculate the gain value.

According to the present aspect, in a case where the gain value calculation unit calculates the gain value, the first gain interpolation unit performs the interpolation. In a case where the gain value calculation unit does not calculate the gain value, the surrounding pixel interpolation unit performs the interpolation. Accordingly, in the present aspect, the surrounding pixel interpolation is performed even in a case where the gain interpolation is not available. Thus, the display image having a favorable image quality can be stably generated.

It is preferable that in a case where the gain value calculation unit does not calculate the gain value, the display image generation unit does not generate the display image of the current frame image.

According to the present aspect, the display image of the current frame image for which the gain value is not calculated and the gain interpolation is not performed is not generated. Accordingly, in the present aspect, the display image of the current frame image not subjected to the gain interpolation is not generated, and the display image is configured with the frame image subjected to the gain interpolation. Thus, a favorable image not giving an awkward feeling can be stably generated.

It is preferable that the image processing apparatus further comprises a parameter obtaining unit that obtains a gain value estimation parameter which is information for estimating the gain value, an estimated gain value calculation unit that calculates an estimated gain value based on the gain value estimation parameter obtained by the parameter obtaining unit, and a second gain interpolation unit that interpolates the pixel value of the phase difference detection pixel of the current frame image using the estimated gain value, and in a case where the estimated gain value calculation unit calculates the estimated gain value, the interpolation control unit causes the second gain interpolation unit to perform the interpolation.

According to the present aspect, the gain value estimation parameter which is the information for estimating the gain value is obtained. The estimated gain value is calculated based on the obtained gain value estimation parameter. The pixel value of the phase difference detection pixel of the current frame image is interpolated using the estimated gain value. Accordingly, in the present aspect, the gain interpolation is performed using the estimated gain value even in a case where the gain value is not calculated. Thus, by increasing the number of frame images subjected to the gain interpolation, the display image having s table image quality and not giving an awkward feeling can be generated.

It is preferable that in a case where the parameter obtaining unit does not obtain the gain value estimation parameter, the display image generation unit does not generate the display image of the current frame image.

According to the present aspect, in a case where the gain value estimation parameter is not obtained, the display image of the current frame image is not generated. Accordingly, in the present aspect, the frame image for which the gain value estimation parameter cannot be obtained and the gain interpolation is not performed is not displayed. Thus, the image quality of the display image is stabilized, and the display image not giving an awkward feeling can be provided.

It is preferable that the gain value estimation parameter obtained by the parameter obtaining unit includes at least one of information related to a shape of a lens pupil through which a luminous flux received by the imaging element passes, or information related to incident ray angle characteristics of the phase difference detection pixel and the normal pixel.

According to the present aspect, the gain value estimation parameter obtained by the parameter obtaining unit includes at least one of the information related to the shape of the lens pupil through which the luminous flux received by the imaging element passes, or the information related to the incident ray angle characteristics of the phase difference detection pixel and the normal pixel. Accordingly, in the present aspect, the gain value can be correctly estimated, and a more favorable image can be provided.

It is preferable that the image processing apparatus further comprises an imaging condition obtaining unit that obtains information related to an imaging condition for the current frame image and the past frame image, and in a case where an amount of change in information related to the imaging condition between the current frame image and the past frame image is greater than or equal to a threshold, the interpolation control unit causes the surrounding pixel interpolation unit to perform the interpolation.

According to the present aspect, the information related to the imaging condition is obtained for the current frame and the past frame. In a case where the amount of change in obtained information related to the imaging condition is greater than or equal to the threshold, the surrounding pixel interpolation unit performs the interpolation. Accordingly, in the present aspect, it is possible to prevent a situation in which a significant difference is present between the imaging condition of the past frame and the imaging condition of the current frame and applying the gain value calculated based on the past frame to the interpolation of the current frame decreases the image quality.

It is preferable that the gain value calculation unit calculates the gain value by calculating a signal ratio of the phase difference detection pixel and the normal pixel of a plurality of the past frame images.

According to the present aspect, the gain value is calculated based on the signal ratio of the phase difference detection pixel and the normal pixel of the plurality of past frame images. Thus, a more continuous display image having a stable image quality and not giving an awkward feeling can be generated.

It is preferable that the imaging element is of a rolling shutter type or a global shutter type.

According to the present aspect, the imaging element is of the rolling shutter type or the global shutter type. Thus, appropriate interpolation can be performed on the pixel value of the phase difference detection pixel output from the imaging element of various types.

It is preferable that the image processing apparatus further comprises a display unit that displays the display image generated by the display image generation unit.

According to the present aspect, the display image generated by the display image generation unit is displayed on the display unit. Thus, an image that has the real-time property and in which the pixel value of the phase difference detection pixel is appropriately interpolated can be provided to a user.

An image processing method that is another aspect of the present invention comprises a step of causing an imaging element in which a plurality of phase difference detection pixels and a plurality of normal pixels are two-dimensionally arranged to sequentially obtain each frame image in time series order of the motion picture from the imaging element during imaging of the motion picture, the frame image having pixel values of the plurality of phase difference detection pixels and pixel values of the plurality of normal pixels, a step of calculating a gain value to be used in gain interpolation of the pixel value of the phase difference detection pixel of a current frame image based on the obtained past frame image in the time series order, a step of interpolating the pixel value of the phase difference detection pixel of the current frame image using the gain value, and a step of generating a display image of the current frame image based on the interpolated pixel value of the phase difference detection pixel of the current frame image and the pixel value of the normal pixel.

It is preferable that the image processing method further comprises a step of calculating a surrounding pixel value based on the pixel value of the normal pixel in a surrounding region of the phase difference detection pixel of the current frame image, and a step of interpolating the pixel value of the phase difference detection pixel of the current frame image using the surrounding pixel value.

It is preferable that the image processing method further comprises a step of controlling operation of a first gain interpolation unit that interpolates the pixel value of the phase difference detection pixel of the current frame image using the gain value and a surrounding pixel interpolation unit that interpolates the pixel value of the phase difference detection pixel of the current frame image using the surrounding pixel value, and causing the first gain interpolation unit to perform the interpolation in a case where the gain value is calculated, and causing the surrounding pixel interpolation unit to perform the interpolation in a case where the gain value is not calculated.

A program that is still another aspect of the present invention and causes a computer to execute an image processing step causes the computer to execute a step of causing an imaging element in which a plurality of phase difference detection pixels and a plurality of normal pixels are two-dimensionally arranged to sequentially obtain each frame image in time series order of the motion picture from the imaging element during imaging of the motion picture, the frame image having pixel values of the plurality of phase difference detection pixels and pixel values of the plurality of normal pixels, a step of calculating a gain value to be used in gain interpolation of the pixel value of the phase difference detection pixels of a current frame image based on the obtained past frame image in the time series order, a step of interpolating the pixel value of the phase difference detection pixel of the current frame image using the gain value, and a step of generating a display image of the current frame image based on the interpolated pixel value of the phase difference detection pixel of the current frame image and the pixel value of the normal pixel.

According to the present invention, the gain value to be used in the gain interpolation of the pixel value of the phase difference detection pixel of the current frame image is calculated based on the past frame image in the time series order. The pixel value of the phase difference detection pixel of the current frame image is interpolated using the calculated gain value. Thus, in the case of generating the display image requiring the real-time property, the gain interpolation can be performed on the pixel value of the phase difference detection pixel, and the display image having a favorable image quality can be generated.

DESCRIPTION OF THE PREFERRED EMBODIMENTS

Hereinafter, an image processing apparatus, an image processing method, and a program according to a preferred embodiment of the present invention will be described in accordance with the appended drawings.

Figure 1:
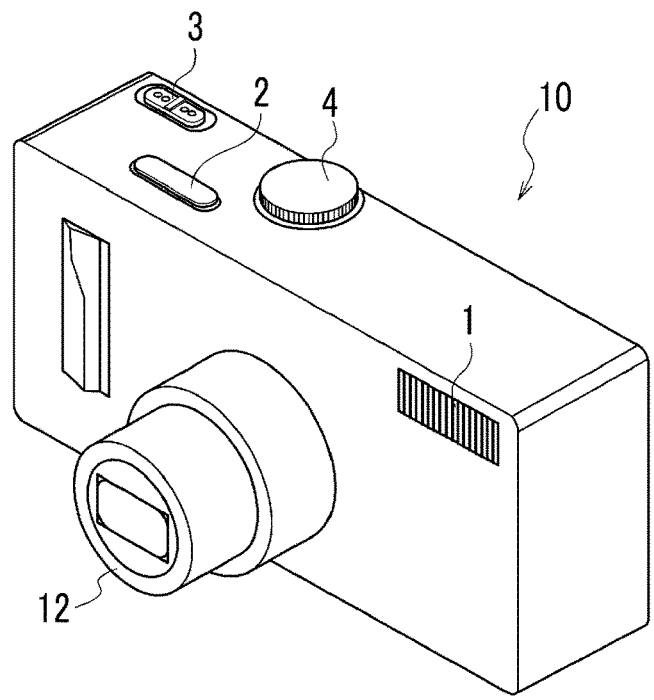
FIG. 1 is a perspective view illustrating one example of an imaging apparatus.
Figure 2:
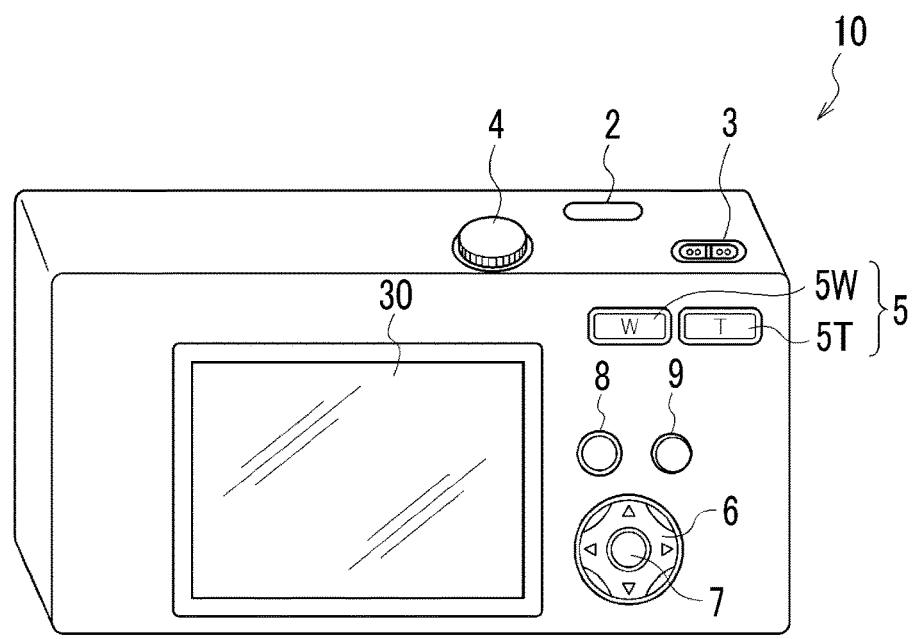
FIG. 2 is a rear view of the imaging apparatus illustrated in FIG. 1.

FIG. 1 and FIG. 2 are respectively a perspective view and a rear view illustrating one example (digital camera) of an imaging apparatus. An imaging apparatus 10 is a digital camera that receives light passing through a lens by an imaging element, converts the light into a digital signal, and records the digital signal in a recording medium as image data of a still picture or a motion picture.

As illustrated in FIG. 1, an imaging lens 12, a strobe 1, and the like are arranged on a front surface, and a shutter button 2, a power supply and/or mode switch 3, a mode dial 4, and the like are arranged on a front surface of the imaging apparatus 10. As illustrated in FIG. 2, a liquid crystal monitor (liquid crystal display (LCD)) 30, a zoom button 5, a cross button 6, a MENU and/or OK button 7, a playback button 8, a BACK button 9, and the like are arranged on the rear surface of the camera.

The imaging lens 12 is composed of a retractable zoom lens and is withdrawn from the main body of the camera by setting an operation mode of the camera to an imaging mode by the power supply and/or mode switch 3. The strobe 1 radiates strobe light to a main subject.

The shutter button 2 is configured with a so-called stroke type switch of two stages including "half push" and "full push" and functions as an imaging preparation instruction unit and also functions as an image recording instruction unit.

In a case where a still picture imaging mode is selected as the imaging mode and the shutter button 2 is subjected to the "half push", the imaging apparatus 10 performs an imaging preparation operation of performing AF and/or auto exposure (AE) control. In a case where the shutter button 2 is subjected to the "full push", the imaging apparatus 10 images and records a still picture.

In addition, in a case where a motion picture imaging mode is selected as the imaging mode and the shutter button 2 is subjected to the "full push", the imaging apparatus 10 starts recording a motion picture. In a case where the shutter button 2 is subjected to the "full push" again, the imaging apparatus 10 stops recording and enters a standby state.

The power supply and/or mode switch 3 functions as a power supply switch for switching a power supply of the imaging apparatus 10 ON or OFF and also functions as a mode switch for setting the mode of the imaging apparatus 10. The power supply/mode switch 3 is arranged to be slidable among an "OFF position", a "playback position", and an "imaging position". The power supply of the imaging apparatus 10 is switched ON by sliding the power supply and/or mode switch 3 to the "playback position" or the "imaging position". The power supply of the imaging apparatus 10 is switched OFF by sliding the power supply/mode switch 3 to the "OFF position". Sliding the power supply and/or mode switch 3 to the "playback position" sets a "playback mode". Sliding the power supply/mode switch 3 to the "imaging position" sets the "imaging mode".

The mode dial 4 functions as a mode switching unit that sets the imaging mode of the imaging apparatus 10. The imaging mode of the imaging apparatus 10 is set to various modes depending on a setting position of the mode dial 4. For example, the "still picture imaging mode" for performing still picture imaging and the "video imaging mode" for performing motion picture imaging are present.

The liquid crystal monitor 30 displays a live view image, a preview image, and a host view image at the time of the imaging mode and displays the still picture or the motion picture at the time of the playback mode. The liquid crystal monitor 30 also functions as a part of a graphical user interface by, for example, displaying a menu screen.

The zoom button 5 functions as zoom instruction means for providing a zoom instruction and includes a tele button 5T for providing a zoom instruction to a telephoto side and a wide button 5W for providing a zoom instruction to a wide angle side. In the imaging apparatus 10, operating the tele button 5T and the wide button 5W at the time of the imaging mode changes the focal length of the imaging lens 12. In addition, operating the tele button 5T and the wide button 5W at the time of the playback mode enlarges and shrinks the image in playback.

The cross button 6 is an operation unit that inputs instructions in four directions of upward, downward, leftward, and rightward directions and functions as a button (cursor movement operation means) for selecting an item from the menu screen or providing an instruction to select various setting items from each menu. A left and/or right key functions as a button (forward direction and backward direction forwarding) for frame forwarding at the time of the playback mode.

The MENU/OK button 7 is an operation button functioning as a menu button for providing an instruction to display the menu on a screen of the liquid crystal monitor 30 and also functioning as an OK button for providing an instruction to, for example, confirm and execute the content of selection.

The playback button 8 is a button for switching to the playback mode in which the imaged and recorded still picture or motion picture is displayed on the liquid crystal monitor 30.

The BACK button 9 functions as a button for providing an instruction to cancel an input operation and return to the immediately previous operation state.

In the imaging apparatus 10 according to the present embodiment, the functions of the buttons and switches may be implemented by disposing and operating a touch panel without disposing members specific to the buttons and switches.

Figure 3:
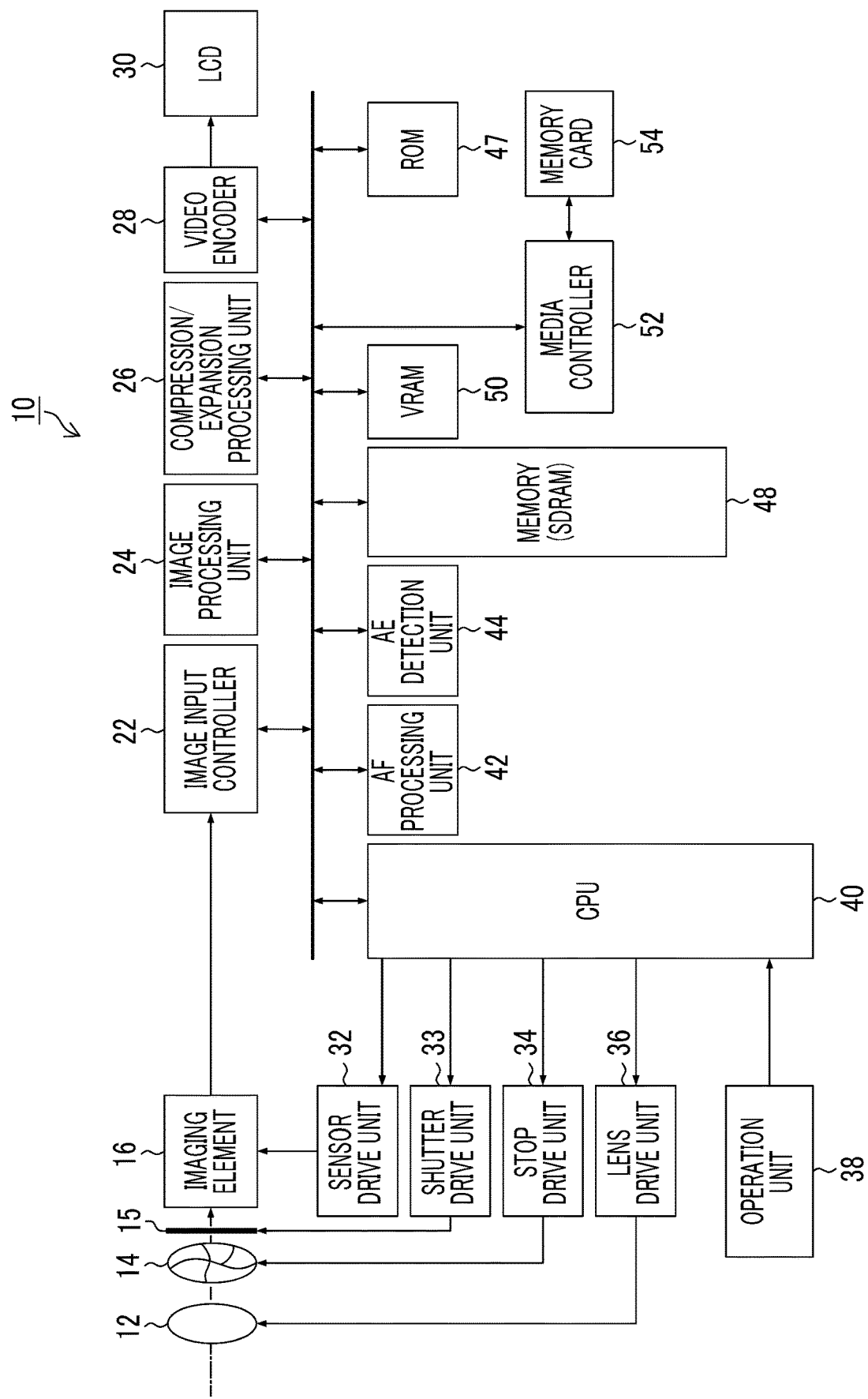
FIG. 3 is a block diagram illustrating one example of an internal configuration of the imaging apparatus illustrated in FIG. 1.

FIG. 3 is a block diagram illustrating an embodiment of an internal configuration of the imaging apparatus 10. The imaging apparatus 10 records the captured image in a memory card 54. The operation of the whole apparatus is managed and controlled by a central processing unit (CPU) 40.

An operation unit 38 such as the shutter button 2, the power supply and/or mode switch 3, the mode dial 4, the tele button 5T, the wide button 5W, the cross button 6, the MENU/OK button 7, the playback button 8, and the BACK button 9 is disposed in the imaging apparatus 10. A signal from the operation unit 38 is input into the CPU 40. The CPU 40 controls each circuit of the imaging apparatus 10 based on the input signal. For example, the CPU 40 performs drive control of the imaging element 16, lens drive control, stop drive control, imaging operation control, image processing control, recording and/or playback control of the image data, and display control of the liquid crystal monitor 30.

In a case where the power supply of the imaging apparatus 10 is switched ON by the power supply and/or mode switch 3, power is supplied to each block from a power supply unit, not illustrated, and the imaging apparatus 10 starts to be driven.

An image of a luminous flux passing through the imaging lens 12, a stop 14, a mechanical shutter 15, and the like is formed in an imaging element 16 that is a complementary metal-oxide semiconductor (CMOS) type color image sensor. The imaging element 16 is not limited to a CMOS type and may be a color image sensor of an XY address type or a charge coupled device (CCD) type.

In the imaging element 16, multiple light-receiving elements (photodiodes) are two-dimensionally arranged. A subject image formed on a light-receiving surface of each photodiode is converted into a signal voltage (or charge) of an amount corresponding to the intensity of an incidence ray. The signal voltage is converted into a digital signal through an analog/digital (A/D) converter in the imaging element 16 and is output.

In the imaging element 16, color filters are arranged in a first periodic color arrangement, illustrated below, on a plurality of pixels configured with photoelectric conversion elements (photodiodes) that are two-dimensionally arranged in the horizontal direction and the vertical direction. In addition, in the imaging element 16, a plurality of phase difference detection pixels and a plurality of normal pixels (pixels other than the phase difference detection pixel) for imaging are arranged.

Figures 4, 5:
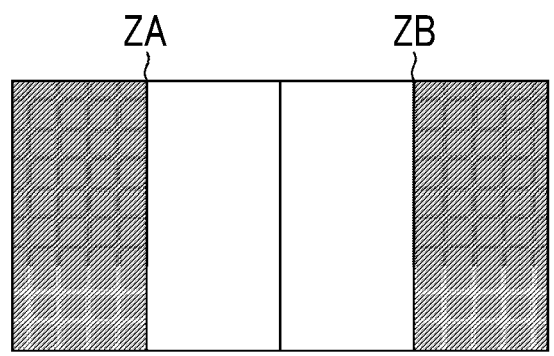
FIG. 4 is a diagram illustrating a color filter arrangement of an imaging element.
FIG. 5 is a plan view schematically illustrating a pair of a first phase difference detection pixel ZA and a second phase difference detection pixel ZB.

As illustrated in FIG. 5, the phase difference detection pixel includes an opening portion for pupil separation and is configured with a first phase difference detection pixel ZA and a second phase difference detection pixel ZB having opening portions at different positions in the horizontal direction. A pair of the first phase difference detection pixel ZA and the second phase difference detection pixel ZB is adjacently arranged to have the opening portions facing each other. Details of the structures of the first phase difference detection pixel ZA and the second phase difference detection pixel ZB will be described below.

FIG. 4 is a diagram illustrating a color filter arrangement and arrangement of the phase difference detection pixels in the imaging element 16.

As illustrated in FIG. 4, a first filter corresponding to a first color (green) and any of a plurality of second filters respectively corresponding to two or more colors (red and blue) other than green are arranged in a first periodic color arrangement in the plurality of normal pixels of the imaging element 16. The first periodic color arrangement of the color filters of the imaging element 16 of the first embodiment is the general Bayer arrangement. The first filter is a G filter transmitting light in a wavelength range of green. The plurality of second filters include an R filter transmitting light in a wavelength range of red and a B filter transmitting light in a wavelength range of blue.

In the imaging element 16 having the Bayer arrangement, normal pixel rows in which only the normal pixels are arranged in the horizontal direction (row direction) include an RG row in which a pixel (R pixel) having the R filter and a pixel (G pixel) having the G filter are alternately arranged in the row direction, and a GB row in which the G pixel and a pixel (B pixel) having the B filter are alternately arranged in the row direction. In addition, the RG row and the GB row are alternately arranged in the vertical direction (column direction).

In addition, the G filter is arranged in each of the first phase difference detection pixel ZA and the second phase difference detection pixel ZB of the present example. In the first phase difference detection pixel ZA and the second phase difference detection pixel ZB, for example, light in a wavelength range wider than the transmission wavelength range of the G filter may be incident without arranging the G filter.

In the imaging element 16, a phase difference detection pixel row in which the first phase difference detection pixel ZA, the second phase difference detection pixel ZB, and the normal pixel are periodically arranged in the row direction is disposed in the GB row at an interval of a plurality of rows. Only the normal pixels are arranged in at least two rows adjacent to the phase difference detection pixel row.

In addition, in the phase difference detection pixel row of the present example, three pixels including the pair of the first phase difference detection pixel ZA and the second phase difference detection pixel ZB and one normal pixel are periodically arranged with the three pixels as one cycle. Accordingly, in the phase difference detection pixel row, the G pixel and the B pixel are alternately arranged in the row direction at an interval of two pixels (the pair of the first phase difference detection pixel ZA and the second phase difference detection pixel ZB).

While the phase difference detection pixel row of the present example is disposed in the GB row of the Bayer arrangement, the phase difference pixel row is not for limitation purposes and may be disposed in the RG row.

An image of one frame (frame image) constituting the motion picture may have a smaller image size than the still picture of full pixels. That is, in the motion picture imaging mode, the imaging element 16 is driven in a thinned-out manner. Accordingly, low power and high speed processing is enabled. In addition, in the case of performing a live view display, the image size may be decreased. Image data corresponding to the frame image according to the embodiment of the present invention includes a pixel value of the phase difference detection pixel.

FIG. 5 is a plan view schematically illustrating the pair of the first phase difference detection pixel ZA and the second phase difference detection pixel ZB.

As illustrated in FIG. 5, the first phase difference detection pixel ZA includes the opening portion in the right half of the pixel, and the second phase difference detection pixel ZB includes the opening portion in the left half of the pixel. That is, the opening portions of the pair of the first phase difference detection pixel ZA and the second phase difference detection pixel ZB face each other.

The normal pixel and the phase difference detection pixel have different pixel characteristics. Thus, in order to obtain favorable image quality, it is necessary to generate a display image after appropriately correcting the phase difference detection pixel.

Figure 6:
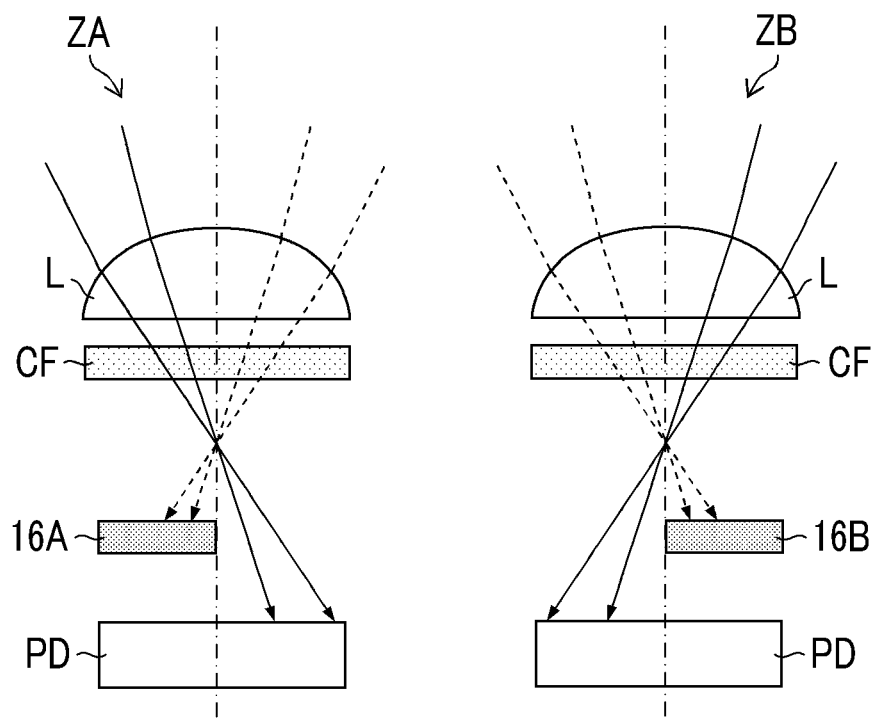
FIG. 6 is an enlarged main view illustrating configurations of the first phase difference detection pixel ZA and the second phase difference detection pixel ZB.

FIG. 6 is an enlarged main view illustrating configurations of the first phase difference detection pixel ZA and the second phase difference detection pixel ZB.

As illustrated in FIG. 6, a light shielding member 16A is arranged on the front surface side (microlens L side) of a photodiode PD of the first phase difference detection pixel ZA, and a light shielding member 16B is arranged on the front surface side of the photodiode PD of the second phase difference detection pixel ZB. The microlens L and the light shielding members 16A and 16B have a pupil separation function. In FIG. 6, the light shielding member 16A shields the left half of the light-receiving surface of the photodiode PD from light. Thus, the first phase difference detection pixel ZA receives only a luminous flux passing on the left side of an optical axis among luminous fluxes passing through an exit pupil of the imaging lens 12. In addition, in the present example, the G filter is arranged below the microlens L as a color filter CF.

The light shielding member 16B shields the right half of the light-receiving surface of the photodiode PD of the second phase difference detection pixel ZB from light. Thus, the second phase difference detection pixel ZB receives only a luminous flux passing on the right side of the optical axis among the luminous fluxes passing through the exit pupil of the imaging lens 12. By the microlens L and the light shielding members 16A and 16B having the pupil separation function, the luminous fluxes passing through the exit pupil on the left and right sides are separated and are respectively incident on the first phase difference detection pixel ZA and the second phase difference detection pixel ZB.

Returning to FIG. 3, the image signal (image data) read from the imaging element 16 at the time of imaging the motion picture or the still picture is temporarily stored in a memory (synchronous dynamic random access memory (SDRAM)) 48 or is input into an AF processing unit 42, an AE detection unit 44, and the like through an image input controller 22.

The CPU 40 manages and controls each unit of the imaging apparatus 10 based on the operation in the operation unit 38 and performs an AF operation and an AE operation at all times during imaging (display) of the live view image and imaging (recording) of the motion picture.

The AF processing unit 42 functioning as a phase difference detection unit is a part performing the phase difference AF process and detects the phase difference using the output signal of each of the first phase difference detection pixel ZA and the second phase difference detection pixel ZB obtained through the image input controller 22.

In a case where phase difference data indicating the phase difference is input from the AF processing unit 42, the CPU 40 functions as a focal point adjusting unit that performs the phase difference AF based on the phase difference data. That is, the CPU 40 calculates a deviation amount (defocus amount) between a focus position of the imaging lens 12 and an image forming surface of the imaging element 16 based on the phase difference data and moves a focus lens in the imaging lens 12 through a lens drive unit 36 such that the calculated defocus amount becomes zero. The calculation of the defocus amount may be performed by the AF processing unit 42.

The AE detection unit 44 calculates the integrating accumulation of the image data (for example, the pixel values of the G pixels of the whole screen) obtained through the image input controller 22 or calculates the integrating accumulation of the image data (pixel values of the G pixels) differently weighted between a center portion and a peripheral portion of the screen and outputs the integrating accumulation value to the CPU 40. The CPU 40 calculates the brightness (imaging exposure value (Ev value)) of the subject from the integrating accumulation value input from the AE detection unit 44. In a case where the imaging mode is the still picture imaging mode, the CPU 40 performs the above AF control again in a case where the shutter button 2 is subjected to a first stage push (half push). In a case where the shutter button 2 is subjected to the full push, the CPU 40 calculates the brightness (imaging Ev value) of the subject, decides the F-number of the stop 14 and a light exposure time (shutter speed) of the mechanical shutter 15 based on the calculated imaging Ev value, and images the still picture (exposure control).

In a case where the imaging mode is the motion picture imaging mode, the CPU 40 starts imaging and recording (picture recording) the motion picture in a case where the shutter button 2 is subjected to the full push. At the time of imaging the motion picture, the CPU 40 opens the mechanical shutter 15, consecutively reads (for example, 30 frames/second or 60 frames/second as a frame rate) the image data from the imaging element 16, consecutively performs the phase difference AF, calculates the brightness of the subject, and controls the shutter speed (a charge accumulation time by rolling shutter) by a shutter drive unit 33 and/or the stop 14 by a stop drive unit 34.

The CPU 40 operates the zoom lens to advance and retract in the optical axis direction through the lens drive unit 36 in response to the zoom instruction from the zoom button 5 and changes the focal length.

In addition, the ROM 47 is a read only memory (ROM) or an electrically erasable programmable read-only memory (EEPROM) in which a camera control program, defect information related to the imaging element 16, and various parameters and tables used in image processing and the like are stored.

The image processing unit 24 reads non-processed image data (RAW data) that is temporarily stored in the memory 48 and is obtained through the image input controller 22 at the time of imaging the motion picture or the still picture. The image processing unit 24 performs an offset process, a pixel interpolation process (interpolation process for the phase difference detection pixel, a defective pixel, and the like), white balance correction, a gain control process including sensitivity correction, gamma-correction processing, demosaicing (referred to as a "demosaicing process"), a brightness and color difference signal generation process, a contour highlighting process, color correction, and the like on the read RAW data.

The image data processed as the live view image by the image processing unit 24 is input into a video RAM random access memory (VRAM) 50.

The VRAM 50 includes an A region and a B region. In each of the A region and the B region, image data representing an image of one frame is recorded. In the VRAM 50, the image data representing the image of one frame is alternately rewritten between the A region and the B region. The written image data is read from a region of the A region and the B region of the VRAM 50 other than a region in which the image data is rewritten.

The image data read from the VRAM 50 is encoded in a video encoder 28 and is output to the liquid crystal monitor 30 disposed on the rear surface of the camera.

The image data (brightness data (Y) and color difference data (Cb) and (Cr)) processed as the still picture or the motion picture for recording by the image processing unit 24 is stored in the memory 48 again.

A compression/expansion processing unit 26 performs a compression process on the brightness data (Y) and the color difference data (Cb) and (Cr) processed by the image processing unit 24 and stored in the memory 48 at the time of recording the still picture or the motion picture. In the case of the still picture, for example, the compression is performed in the joint photographic coding experts group (JPEG) format. In the case of the motion picture, for example, the compression is performed in the H.264 format. The compression image data compressed by the compression/expansion processing unit 26 is recorded in the memory card 54 through a media controller 52.

In addition, the compression/expansion processing unit 26 performs an expansion process on the compression image data obtained from the memory card 54 through the media controller 52 at the time of the playback mode. For example, the media controller 52 records and reads the compression image data in the memory card 54.

In the case of performing the phase difference AF, the CPU 40 functioning as an autofocus control unit outputs a read instruction for reading the image data of the phase difference detection pixel row in at least an AF region of the imaging element 16 to a sensor drive unit 32 and reads the corresponding image data from the imaging element 16.

At the time of imaging and displaying the motion picture (including the live view image), the CPU 40 obtains a thinning-out rate for reading the image data from the imaging element 16 in a thinned-out manner. The thinning-out rate may be a preset fixed value or may be able to be selected by a user from a plurality of thinning-out rates. For example, the optimal thinning-out rate can be set in connection with selection of the image size of the motion picture or selection of the frame rate. The rows read in a thinned-out manner include the phase difference detection pixel row.

The CPU 40 outputs a read instruction indicating a thinning-out pattern (extraction pattern) corresponding to the thinning-out rate to the sensor drive unit 32 and reads the image data from the imaging element 16 in a thinned-out manner.

The AF processing unit 42 extracts output data of the phase difference detection pixel (the first phase difference detection pixel ZA and the second phase difference detection pixel ZB) in the AF region from the read phase difference detection pixel row and detects the phase difference between the output data of the first phase difference detection pixel ZA and the output data of the second phase difference detection pixel ZB. For example, the phase difference is obtained from a shift amount in the left-right direction between the output data of the first phase difference detection pixel ZA and the output data of the second phase difference detection pixel ZB when the correlation between the pair of the output data of the first phase difference detection pixel ZA of the first phase difference detection pixel ZA and the output data of the second phase difference detection pixel ZB of the second phase difference detection pixel ZB is maximized (when an integrating accumulation value of an absolute difference value between the pixel values of the pair of phase difference detection pixels is minimized).

A value obtained by correcting the obtained shift amount by a positional deviation in the horizontal direction between the pair of the first phase difference detection pixel ZA and the second phase difference detection pixel ZB can be calculated as the phase difference data. A method of calculating the phase difference is not limited to the above method, and various methods can be applied.

Next, the CPU 40 calculates the deviation amount (defocus amount) between the focus position of the imaging lens 12 (imaging optical system) and the image forming surface of the imaging element 16 based on the phase difference data detected by the AF processing unit 42. The calculation of the defocus amount may be performed by the AF processing unit 42.

The CPU 40 performs the phase difference AF by moving the focus lens in the imaging lens 12 through the lens drive unit 36 based on the calculated defocus amount such that the defocus amount becomes zero.

In the imaging element 16, the pair of the first phase difference detection pixel ZA and the second phase difference detection pixel ZB is adjacently arranged to have the opening portions facing each other. Thus, the interval between the pair of the first phase difference detection pixel ZA and the second phase difference detection pixel ZB is the minimum. Accordingly, a spatial sampling frequency of the phase difference can be maximized, and the phase difference AF for the subject having a high spatial frequency can be performed with higher accuracy than that in a case where the pair of the first phase difference detection pixel and the second phase difference detection pixel is separately arranged with the normal pixel interposed therebetween.

The rows read from the imaging element 16 in a thinned-out manner at the time of generating the motion picture can include the phase difference detection pixel row including the phase difference detection pixel (the first phase difference detection pixel ZA and the second phase difference detection pixel ZB). The phase difference AF can be appropriately performed even during imaging of the motion picture.

First Embodiment

Figure 7:
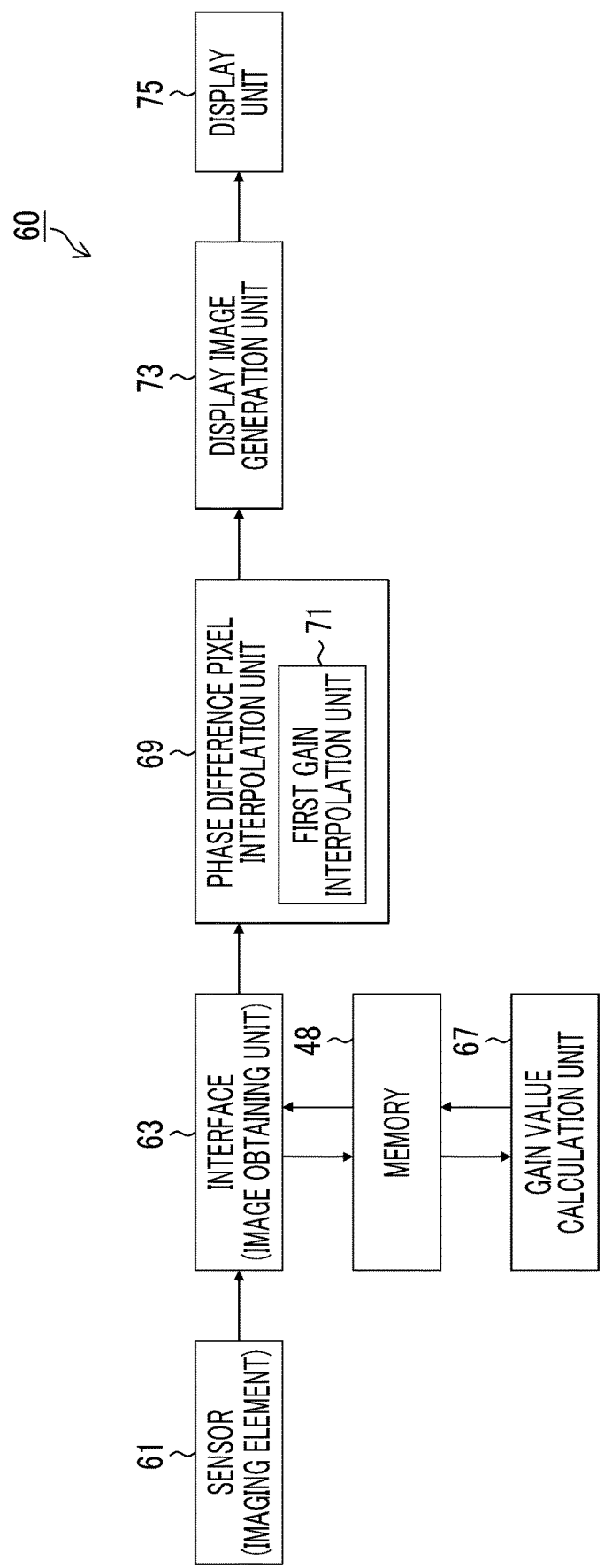
FIG. 7 is a block diagram illustrating a functional configuration example of an image processing apparatus.

A first embodiment of the present invention will be described. FIG. 7 is a block diagram illustrating a functional configuration example of an image processing apparatus 60 of the present embodiment. The image processing apparatus 60 is disposed in the imaging apparatus 10.

The image processing apparatus 60 of the present embodiment comprises a sensor 61, an interface 63, a memory 48, a gain value calculation unit 67, a phase difference pixel interpolation unit 69, a display image generation unit 73, and a display unit 75.

The sensor 61 is implemented by the imaging element 16. As described above, a plurality of phase difference detection pixels and a plurality of normal pixels are two-dimensionally arranged in the imaging element 16.

The interface 63 functions as an image obtaining unit and is implemented by the image input controller 22. The interface 63 sequentially obtains each frame image having the pixel values of the plurality of phase difference detection pixels and the pixel values of the plurality of normal pixels in time series order of the motion picture from the imaging element 16 during the imaging of the motion picture. The interface 63 can set (store) pixel data output from the sensor 61 in the memory 48 and can also pass the pixel data to a circuit in the subsequent stage without passing through the memory 48. In addition, the pixel data set in the memory 48 may be read and transmitted to the circuit in the subsequent stage. In the case of generating the live view image, it is desirable that the interface 63 passes the pixel data output from the sensor 61 to a process in the subsequent stage without passing through the memory 48 in order to secure a real-time property. Accordingly, in the case of generating the live view image, there is no time to set the pixel data in the memory 48, calculate a gain value, and perform gain interpolation.

Figure 8:
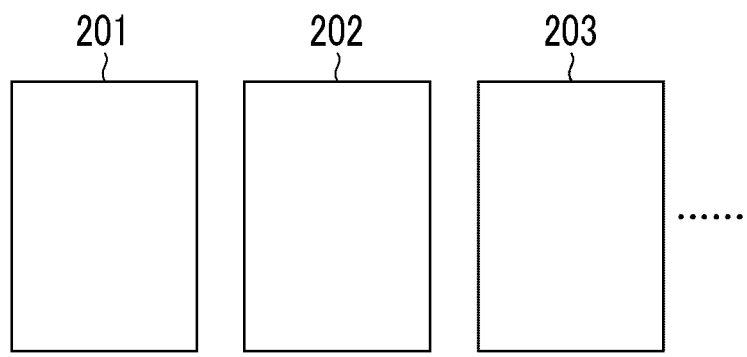
FIG. 8 is a diagram illustrating each frame in time series order.

FIG. 8 is a diagram conceptually illustrating each frame in time series order of the motion picture input into the interface 63. The frame images input into the interface 63 are a first frame 201, a second frame 202, and a third frame 203 that are sequentially continuous. For example, in the case of interpolating the pixel value of the phase difference detection pixel in the second frame 202, the second frame 202 is the current frame, and the first frame 201 is the past frame. In addition, in the case of interpolating the pixel value of the phase difference detection pixel in the third frame 203, the third frame 203 is the current frame, and the second frame 202 is the past frame. In the case of interpolating the pixel value of the phase difference detection pixel in the first frame 201, the first frame 201 is the current frame. Since the first frame 201 is the initial frame, the past frame is not present.

Returning to FIG. 7, the memory 48 is configured with an SDRAM as described above.

The gain value calculation unit 67 calculates the gain value to be used in the gain interpolation of the pixel value of the phase difference detection pixel of the current frame image based on the past frame image in time series order obtained by the image obtaining unit.

The gain value changes depending on an image height (position in the screen). Therefore, for example, the gain value calculation unit 67 divides the frame image plane into K×L areas and calculates the gain value in each area. For convenience, a plurality of gain values with respect to one frame will be referred to as a gain value set.

In a case where the gain value calculation unit 67 calculates the gain value in only the immediately previous frame (past frame), the gain value calculation unit 67 uses the gain value set calculated in the immediately previous frame (past frame) for the current frame.

In addition, the gain value calculation unit 67 may calculate the gain value by calculating a signal ratio of the phase difference detection pixel and the normal pixel in a plurality of past frame images.

In this case, the gain value calculation unit 67 calculates the average of N sets of gain values calculated in N past frames for each area and uses the average for the current frame.

Specifically, a frame number is denoted by k (current frame is 0; 1, 2, 3, . . . to the past). Coordinates of the area in which the gain value is calculated is denoted by (x, y). The gain value of (x, y) of the k frame is denoted by G(k, x, y). Since the average of the gain value of the same area is calculated throughout the N past frames, a gain value set G'(x, y) applied to the current frame is calculated as follows.

$$G'(x, y) = \frac{1}{N} \sum_{k=1}^{N} G(k, x, y) \quad \text{(Expression 1)}$$

In a more preferable aspect, a weight w(k) is prepared for each frame.

$$G'(x, y) = \frac{\sum_{k=1}^{N} w(k) \cdot G(k, x, y)}{\sum_{k=1}^{N} w(k)} \quad \text{(Expression 2)}$$

Here, w(k) is set to 0 for a frame not used in the average calculation and 1 for a frame used in the average calculation. For example, in a case where a stop F1 at the time of light exposure of the current frame is different from a stop F2 at the time of light exposure of the k-th past frame by a predetermined degree, k-th w(k) is set to 0. The aspect of changing the calculation of the gain value depending on the amount of change between an imaging condition of the current frame and an imaging condition of the past frame will be illustrated in detail in FIG. 16.

The gain value calculation unit 67 calculates the gain value by analyzing the RAW data. Specifically, the RAW data is divided into K×L areas. In each area, an average value Gave of the G pixels and an average value Pave of the phase difference detection pixels are calculated, and the gain value is calculated as Gave/Pave. At this point, in a case where black crushing occurs in the area, the values of Gave and Pave are significantly decreased, and the gain value cannot be accurately calculated. In addition, in a case where the area is saturated, the gain value cannot be accurately calculated. Therefore, it is preferable not to use the gain value of such an area in the average calculation illustrated in (Expression 1) and (Expression 2).

Accordingly, the weight w(k) in (Expression 2) is set for each area. That is, the weight is represented as w(k, x, y). In the k-th frame, in a case where it is considered that the accuracy of the gain value of the area of (x, y) is low, w(k, x, y)=0 is set. More specifically, in a case where the number of pixels of which the level is greater than or equal to a threshold TH1 and less than or equal to a threshold TH2 is less than a threshold TH3 among the G pixels in the area where the gain value calculation is performed, it is considered that the accuracy of the gain value is low, and the value of w(k, x, y) is adjusted.

The phase difference pixel interpolation unit 69 is implemented by the image processing unit 24 and comprises a first gain interpolation unit 71. The first gain interpolation unit 71 interpolates the pixel value of the phase difference detection pixel of the current frame image using the gain value calculated by the gain value calculation unit 67. That is, the first gain interpolation unit 71 performs interpolation of setting the pixel value of the phase difference detection pixel to have the same signal level as the normal pixel by multiplying the pixel value of the phase difference detection pixel by the gain value calculated by the gain value calculation unit 67 in order to supplement a decrease in sensitivity of the phase difference detection pixel.

The display image generation unit 73 is implemented by the image processing unit 24 and generates a display image of the current frame image based on the pixel value of the phase difference detection pixel of the current frame image interpolated by the first gain interpolation unit 71 and the pixel value of the normal pixel. That is, the display image generation unit 73 generates the display image of the current frame in which the pixel value of the phase difference detection pixel is interpolated.

The display unit 75 displays the display image generated by the display image generation unit 73. The display unit 75 displays the display image on the liquid crystal monitor 30. For example, the display unit 75 displays the live view image, the preview image, or the host view image on the liquid crystal monitor 30.

Second Embodiment

Next, a second embodiment of the present invention will be described. In the present embodiment, surrounding pixel interpolation that is performed based on a surrounding pixel value is performed on the pixel value of the phase difference detection pixel along with the gain interpolation.

Figure 9:
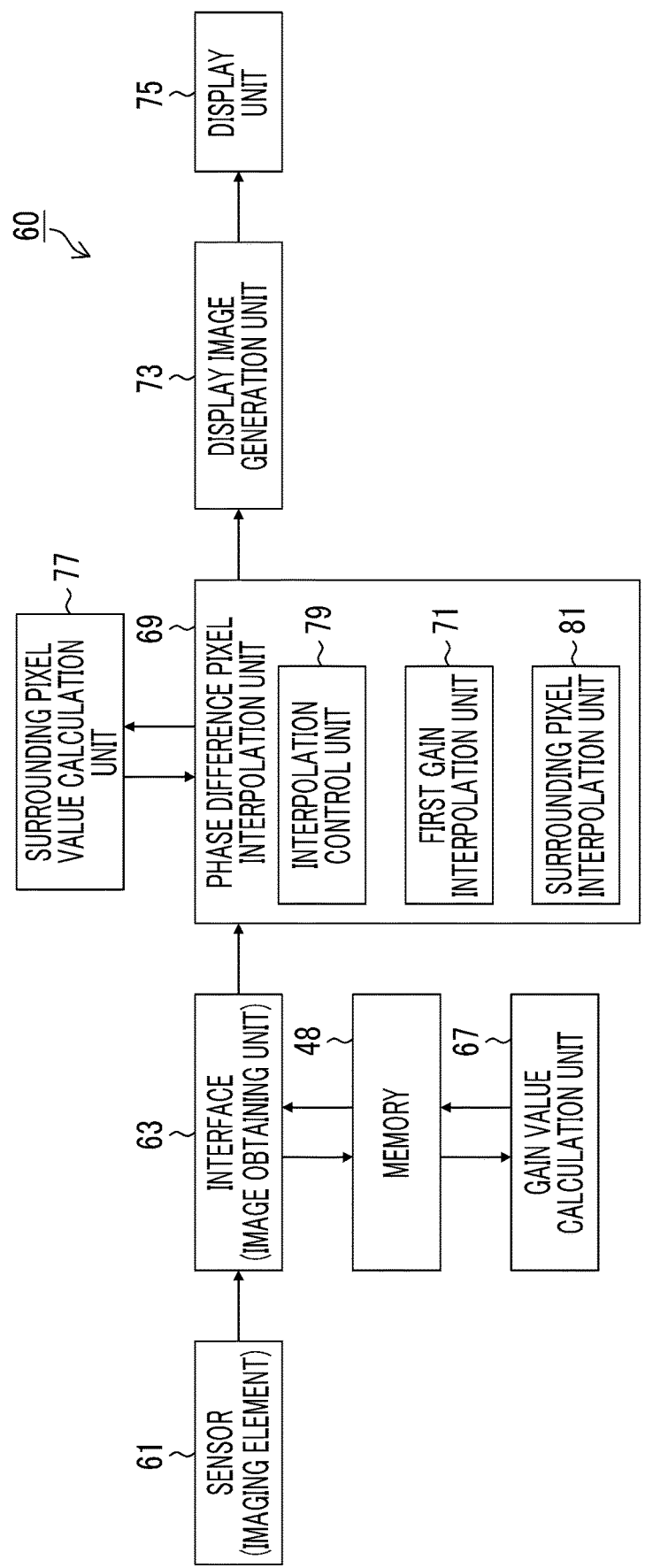
FIG. 9 is a block diagram illustrating a functional configuration example of the image processing apparatus.

FIG. 9 is a block diagram illustrating a functional configuration example of the image processing apparatus 60 of the present embodiment. Parts already described in FIG. 7 will be designated by the same reference signs, and descriptions of such parts will not be repeated.

A surrounding pixel value calculation unit 77 is implemented by the CPU 40 and calculates the surrounding pixel value based on the pixel value of the normal pixel in a surrounding region of the phase difference detection pixel of the current frame image. For example, the surrounding pixel value calculation unit 77 calculates the surrounding pixel value by calculating the weighted average of the pixel values of the surrounding pixels of a focused pixel (phase difference detection pixel) subjected to the interpolation. The surrounding pixel is appropriately decided depending on the accuracy of the interpolation and the imaging condition. For example, the surrounding pixel is the normal pixel in a range of 3×3, 5×5, and 7×7 with the focused pixel at the center. The surrounding pixel value calculation unit 77 can calculate the surrounding pixel value using a well-known method other than the weighted average.

The phase difference pixel interpolation unit 69 comprises the first gain interpolation unit 71, an interpolation control unit 79, and a surrounding pixel interpolation unit 81.

The surrounding pixel interpolation unit 81 interpolates the pixel value of the phase difference detection pixel of the current frame image using the surrounding pixel value. That is, the surrounding pixel interpolation unit 81 interpolates the pixel value of the focused pixel by using the surrounding pixel value obtained by calculating the weighted average of the pixel values of the normal pixels surrounding the focused pixel (phase difference detection pixel) as the pixel value of the focused pixel.

The interpolation control unit 79 controls the operation of the first gain interpolation unit 71 and the surrounding pixel interpolation unit 81. For example, in a case where the gain value calculation unit 67 calculates the gain value, the interpolation control unit 79 causes the first gain interpolation unit 71 to perform the interpolation. In a case where the gain value calculation unit 67 does not calculate the gain value, the interpolation control unit 79 causes the surrounding pixel interpolation unit 81 to perform the interpolation.

Display Example 1

Next, a display example of the display image on the liquid crystal monitor 30 in the second embodiment will be described. Display Example 1 is a case where the pixel value of the phase difference detection pixel used in the first frame is interpolated by only the surrounding pixel interpolation.

Figure 10:
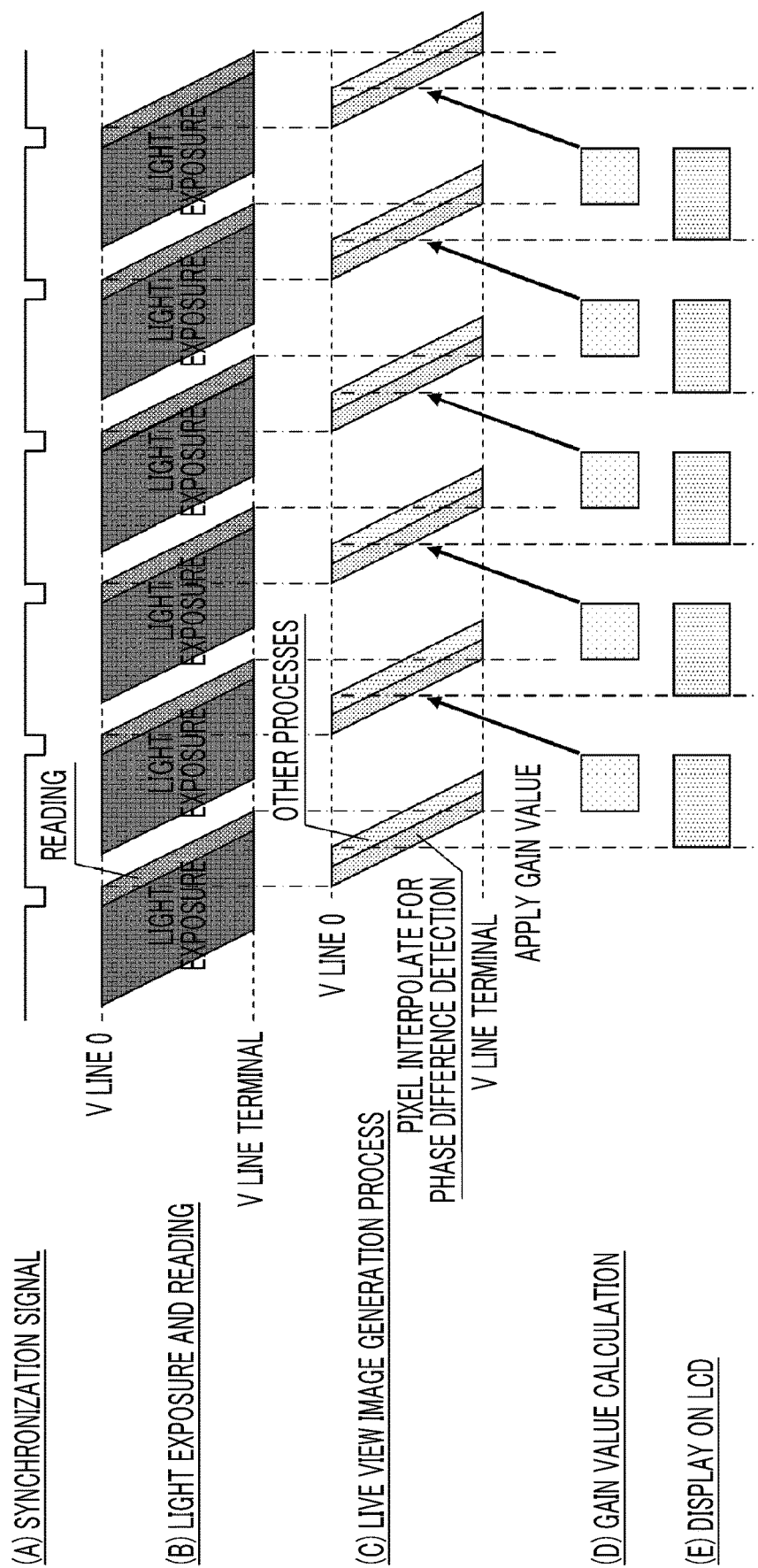
FIG. 10 is a sequence diagram of light exposure to a display of an image.

FIG. 10 is a sequence diagram obtained by adding a timing of the gain value calculation to a sequence diagram of light exposure of the imaging element 16 to the display of the live view image.

In FIG. 10, (A) VD synchronization signal, (B) light exposure and reading, (C) live view image generation process, (D) gain value calculation, and (E) display on liquid crystal monitor 30 are illustrated.

In the case illustrated in FIG. 10, light exposure is performed on the imaging element 16 of a rolling shutter type. After the light exposure, the pixel data including the pixel value of each line is sequentially transferred to an application specific integrated circuit (ASIC) ("reading" in FIG. 10(B)) in accordance with the vertical driving (VD) synchronization signal (FIG. 10(A)). The ASIC has the functions of the interface 63, the gain value calculation unit 67, the surrounding pixel value calculation unit 77, the phase difference pixel interpolation unit 69 (the interpolation control unit 79, the first gain interpolation unit 71, and the surrounding pixel interpolation unit 81), and the display image generation unit 73.

The ASIC generates the live view image by processing the pixel data received from the sensor 61. The process of the ASIC includes the interpolation of the pixel value of the phase difference detection pixel performed by the phase difference pixel interpolation unit 69 and other processes performed by the display image generation unit 73 (FIG. 10(C)). The other processes indicate general signal processing used in the generation of the live view image such as demosaicing, noise reduction, and contour highlighting. In a case where the currently processed frame is the first frame, the interpolation control unit 79 of the ASIC causes the surrounding pixel interpolation unit 81 to interpolate the pixel value of the phase difference detection pixel.

Next, after the reading from the sensor is completely finished, the ASIC calculates the gain value based on the read pixel value (FIG. 10(D)). The calculated gain value cannot be used in time for the display of the current frame image on the liquid crystal monitor 30 and thus, is used in the interpolation process of the subsequent frame image.

In a case where the density of the phase difference detection pixels is high, the accuracy of the surrounding pixel interpolation is decreased. Thus, it is preferable to actively perform the interpolation using the gain interpolation. In order to perform the gain interpolation, it is necessary to calculate the signal ratio (=gain value to be used in the gain interpolation) of the phase difference detection pixel and the normal pixel. The calculation of the signal ratio needs to use large line data compared to a live view process. Thus, the signal ratio has to be calculated after temporarily loading the pixel data in the memory 48. It is difficult to apply the calculated signal ratio to the current frame in terms of timing.

That is, from the viewpoint of increasing the image quality of the display image, it is preferable to interpolate the phase difference pixel in the current frame image after calculating the gain value. However, in securing the real-time property required for the live view display, a time taken for the calculation of the gain value poses a problem. That is, in a case where the gain interpolation is performed by calculating the gain value, it is difficult to secure the real-time property of the live view display. Accordingly, in the present invention, in the case of generating a display image of the first frame after starting the live view display, the display image is generated by interpolating the pixel value of the phase difference detection pixel using only the surrounding pixel interpolation in a case where an appropriate gain value is not present.

In addition to the live view display displayed in a case where the power supply is switched ON, the present invention can be applied to the live view display immediately after switching from the playback mode to the imaging mode and the live view display after switching from a drive mode in which a line including the phase difference detection pixel is not set as an output target to a drive mode in which the line is set as the output target.

Figure 11:
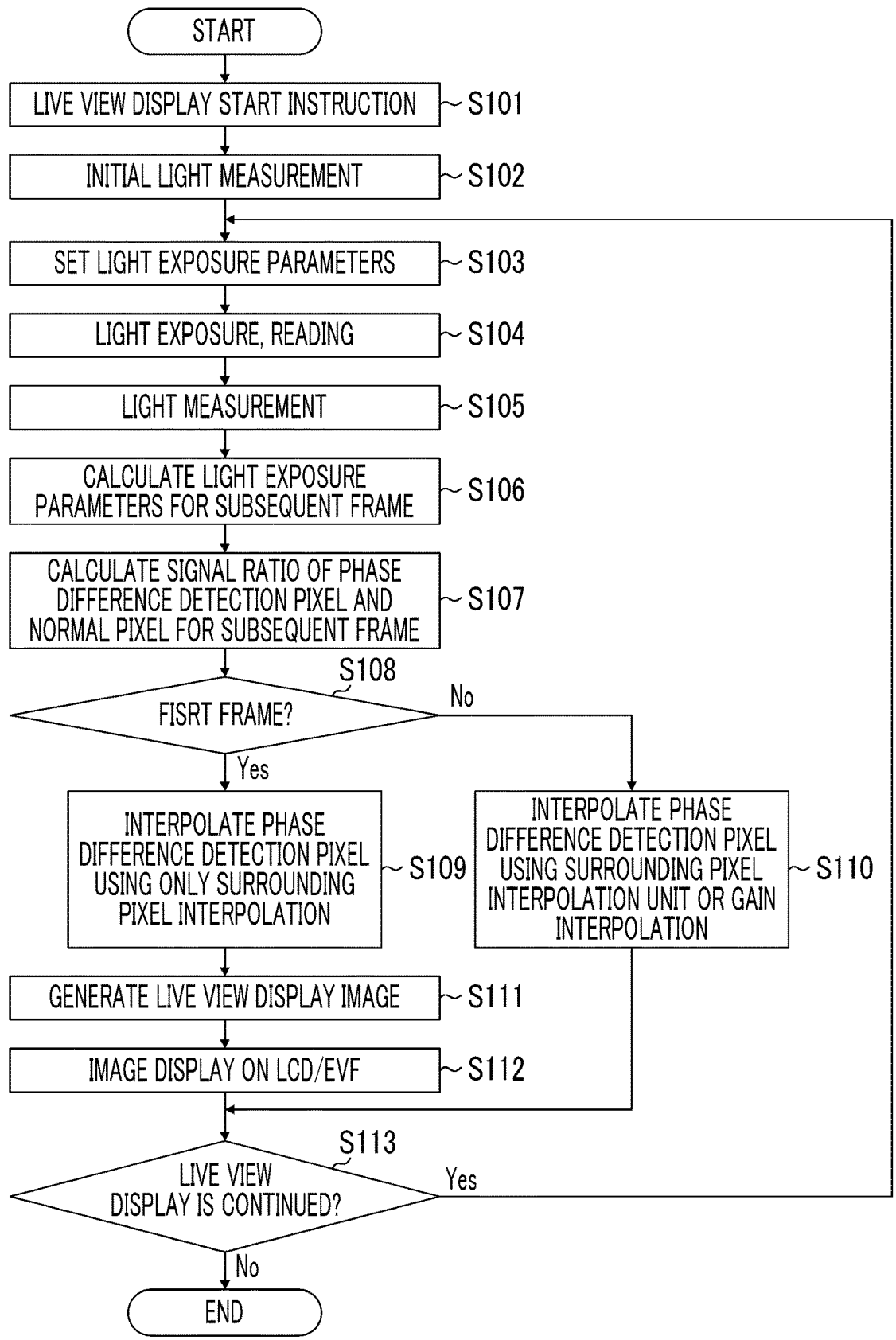
FIG. 11 is a diagram illustrating a display operation flow of the image processing apparatus.

FIG. 11 is a diagram illustrating a display operation flow of the live view image of the image processing apparatus 60.

First, a live view display start instruction is output (step S101). For example, the live view display start instruction is output by the CPU 40 at the same as the switching ON of the power supply switch and/or mode switch 3 of the imaging apparatus 10. For example, when the live view display is started after the camera is started or after the still picture is imaged, light measurement is performed in order to decide a light exposure amount of the live view display (initial light measurement) (step S102). However, for example, the initial light measurement can be replaced with a light measurement result at the time of imaging the still picture immediately before starting the live view display.

Then, the result of the initial light measurement is received, and light exposure parameters (a stop, an ISO sensitivity, a shutter speed, and a sensor frame rate at the time of live view) of the live view display are set (step S103). Light exposure and reading of the pixel data are performed using the VD synchronization signal (for each frame) (step S104). The light exposure is performed by a light measurement sensor comprised in the imaging apparatus 10. The light exposure parameters are set by the CPU 40. The reading is performed by the interface 63.

The light measurement is performed using the obtained pixel data (step S105). The light exposure parameters for the subsequent frame are decided by the CPU 40 (step S106). Furthermore, the gain value for the gain interpolation is calculated by the gain value calculation unit 67 using the pixel data (step S107).

Then, the interpolation control unit 79 determines whether or not the current frame is the first frame (step S108). In a case where the current frame is the first frame, that is, in a case where the gain value calculation unit 67 does not calculate the gain value, the interpolation control unit 79 causes the surrounding pixel interpolation unit 81 to perform the surrounding pixel interpolation, and the phase difference detection pixel is interpolated using only the surrounding pixel interpolation (step S109).

In a case where the current frame is not the first frame, that is, in a case where the gain value calculation unit 67 calculates the gain value, the interpolation control unit 79 interpolates the phase difference detection pixel using the surrounding pixel interpolation unit 81 or the gain interpolation (step S110). In this case, the interpolation of the phase difference detection pixel is performed considering an imaging status and the state of the frame image. The interpolation control unit 79 causes only the first gain interpolation unit 71 to perform the interpolation or causes the first gain interpolation unit 71 and the surrounding pixel interpolation unit 81 to perform the interpolation. For example, the interpolation control unit 79 controls the operation of the first gain interpolation unit 71 and the surrounding pixel interpolation unit 81 depending on a frequency component of the frame image and/or the degree of achieved focus.

Then, the live view image is generated by the display image generation unit 73 (step S111), and the display image is displayed on the liquid crystal monitor 30 or an electric viewfinder (EVF) (step S112). Then, for example, the CPU 40 determines whether or not to continue the live view display (step S113). In the case of continuing the live view display, the light exposure parameters are set based on the calculated light exposure parameters. In the case of not continuing the live view display, the flow is finished.

In the embodiments, hardware structures of processing units executing various processes correspond to various processors illustrated below. Various processors include a central processing unit (CPU) that is a general-purpose processor functioning as various processing units by executing software (program), a programmable logic device (PLD) such as a field programmable gate array (FPGA) that is a processor capable of changing a circuit configuration after manufacturing, a dedicated electric circuit such as an application specific integrated circuit (ASIC) that is a processor having a circuit configuration dedicatedly designed to execute a specific process, and the like.

One processing unit may be configured with one of the various processors or may be configured with two or more processors (for example, a plurality of FPGAs or a combination of a CPU and an FPGA) of the same type or different types. In addition, a plurality of processing units may be configured with one processor. A first example of configuring a plurality of processing units with one processor is such that one processor is configured with a combination of one or more CPUs and software, and the processor functions as the plurality of processing units, as represented by a computer such as a client or a server. A second example is such that a processor that implements the function of the whole system including the plurality of processing units using one integrated circuit (IC) is used, as represented by a system on chip (SoC) or the like. Various processing units are configured using one or more of the various processors as a hardware structure.

Furthermore, the hardware structure of the various processors is more specifically circuitry in which circuit elements such as a semiconductor element are combined.

Each configuration and each function described above can be appropriately implemented by any hardware, software, or a combination of both hardware and software. For example, the present invention can also be applied to a program that causes a computer to execute the process steps (process procedure) described above, a computer-readable recording medium (non-transitory recording medium) on which the program is recorded, or a computer on which the program can be installed.

Display Example 2

Next, a display example of the live view image on the liquid crystal monitor 30 in the first embodiment and the second embodiment will be described. In Display Example 2, the gain value is not calculated in the first frame image, and the gain interpolation cannot be performed on the first frame image. Thus, the first frame image is not displayed.

Figure 12:
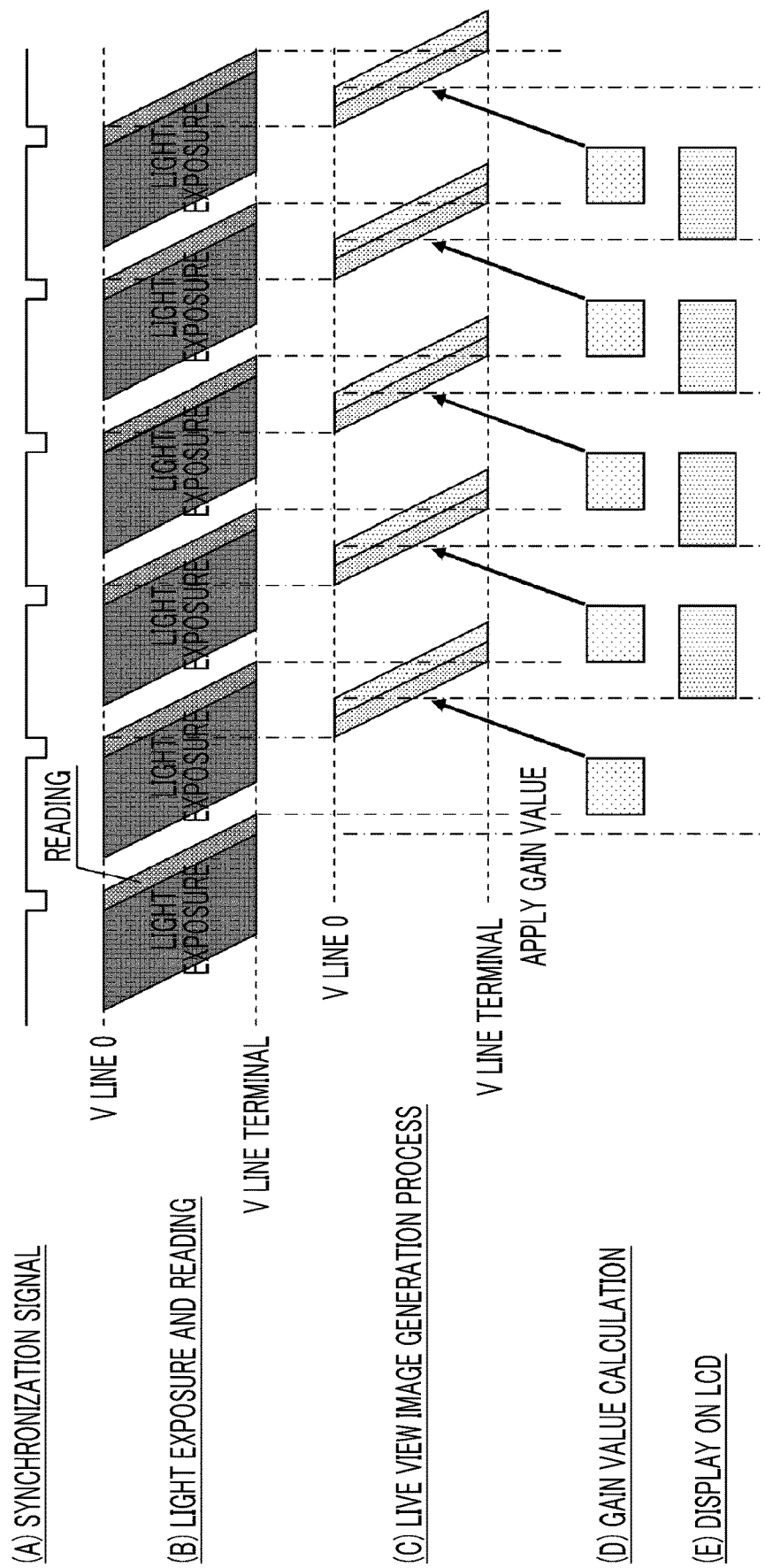
FIG. 12 is a sequence diagram of the light exposure to the display of the image.

FIG. 12 is a sequence diagram obtained by adding the timing of the gain value calculation to the sequence diagram of the light exposure of the imaging element 16 to the display of the live view image like FIG. 9. The sequence diagram in FIG. 12 is different from the sequence diagram in FIG. 9 in that the first frame is not displayed on the liquid crystal monitor 30.

For the first frame image, the pixel data received from the sensor 61 is processed, and the gain value is calculated by the gain value calculation unit 67 (FIG. 10(D)). However, since the first frame image is not displayed, the interpolation by the surrounding pixel interpolation unit 81 and the generation of the display image of the first frame by the display image generation unit 73 are not performed.

For the second image and the subsequent images, the interpolation is performed based on the gain value calculated by the gain value calculation unit 67, and the corresponding live view image is displayed on the liquid crystal monitor 30 as illustrated in FIG. 10.

Figure 13:
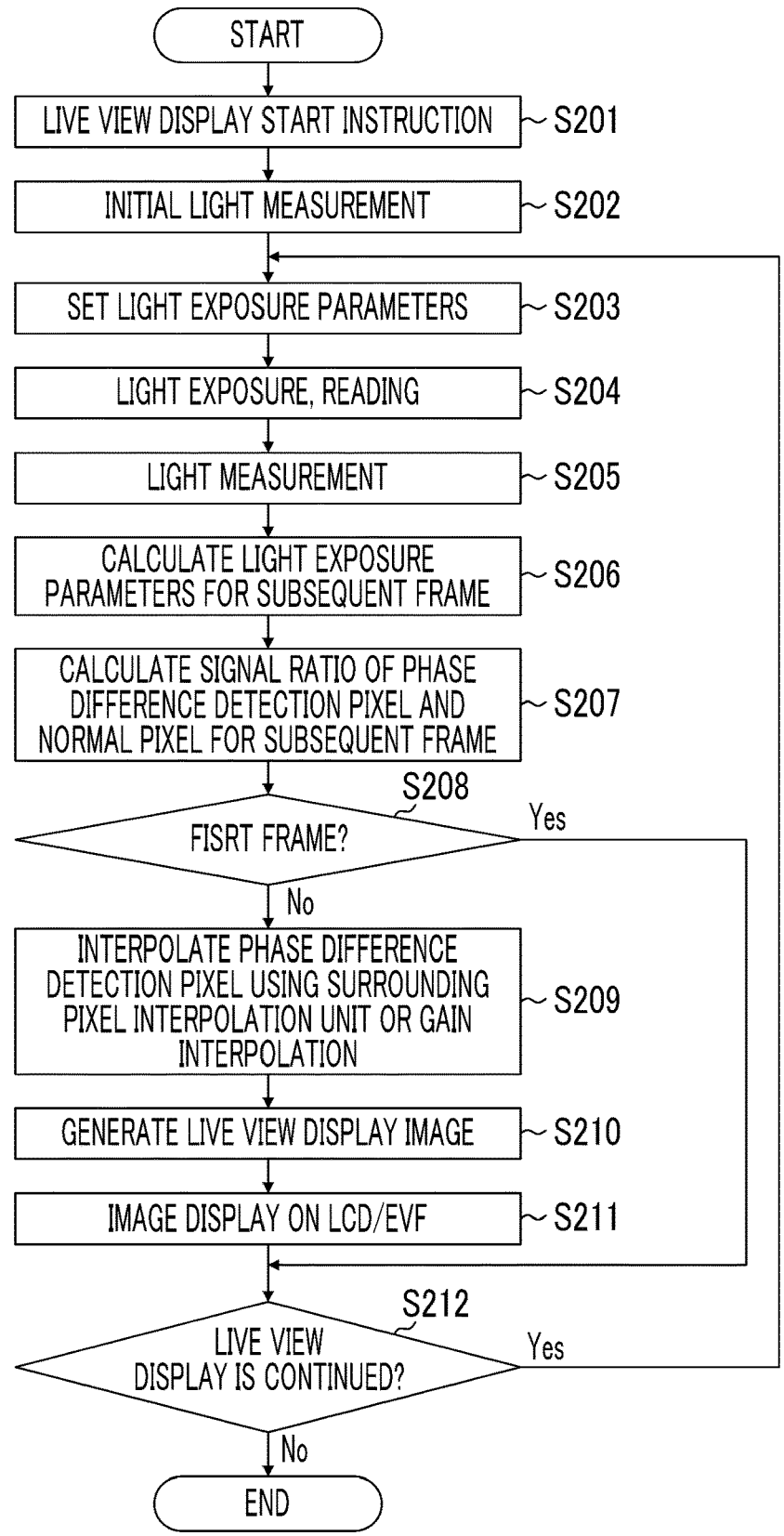
FIG. 13 is a diagram illustrating the display operation flow of the image processing apparatus.

FIG. 13 is a diagram illustrating a display operation flow of the image processing apparatus 60.

First, the live view display start instruction is output by the CPU 40 (step S201). Then, the initial light measurement is performed (step S202), and the light exposure parameters are set (step S203). The light measurement is performed by the light measurement sensor comprised in the imaging apparatus 10. The light exposure parameters are set by the CPU 40.

The light exposure is performed based on the set light exposure parameters, and the interface 63 reads the pixel value from the pixel subjected to the light exposure (step S204). The light measurement is performed by the light measurement sensor (step S205). The light exposure parameters for the subsequent frame are decided by the CPU 40 (step S206). The signal ratio of the phase difference detection pixel and the normal pixel for the subsequent frame is calculated by the gain value calculation unit 67 (step S207).

Then, the interpolation control unit 79 determines whether or not the current frame is the first frame (step S208). In a case where the current frame is not the first frame, that is, in a case where the gain value calculation unit 67 calculates the gain value, the interpolation control unit 79 interpolates the phase difference detection pixel using the surrounding pixel interpolation unit 81 or the gain interpolation (step S209).

Then, the live view image is generated by the display image generation unit 73 (step S210), and the display image is displayed on the liquid crystal monitor 30 or the EVF (step S211).

In a case where the interpolation control unit 79 determines that the current frame is the first frame, that is, in a case where the gain value calculation unit 67 does not calculate the gain value, the display image generation unit 73 does not generate the display image. That is, the first frame is not displayed on the liquid crystal monitor 30.

Then, for example, the CPU 40 determines whether or not to continue the live view display (step S212). In the case of continuing the live view display, the light exposure parameters are set based on the calculated light exposure parameters. In the case of not continuing the live view display, the flow is finished.

Third Embodiment

Next, a third embodiment of the present invention will be described. In the present embodiment, the pixel value of the phase difference detection pixel is interpolated based on an estimated gain value.

Figure 14:
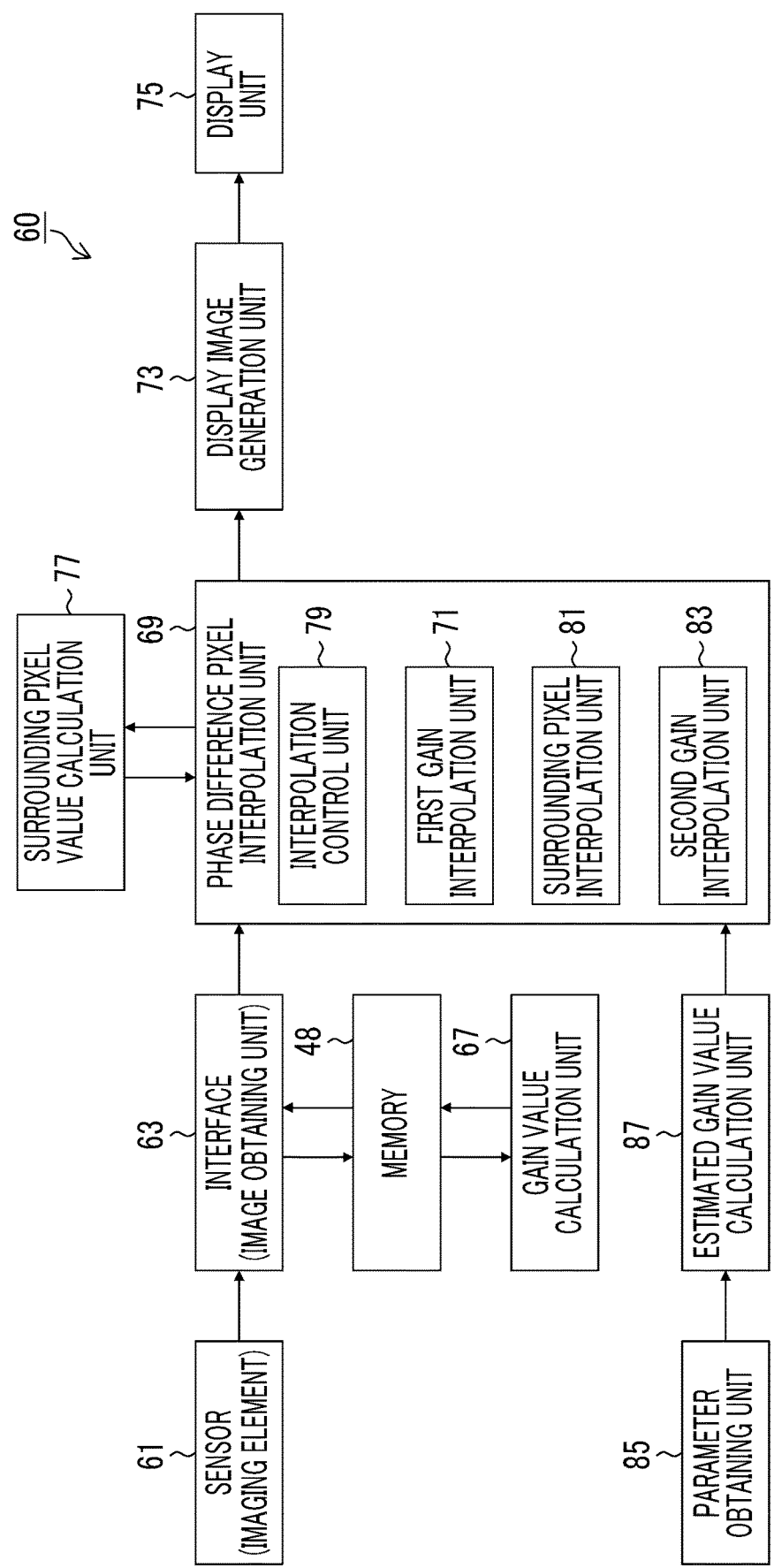
FIG. 14 is a block diagram illustrating a functional configuration example of the image processing apparatus.

FIG. 14 is a block diagram illustrating a functional configuration example of the image processing apparatus 60 of the present embodiment. Parts already described in FIG. 7 will be designated by the same reference signs, and descriptions of such parts will not be repeated.

The image processing apparatus 60 of the present embodiment comprises the sensor 61, the interface 63, the memory 48, the gain value calculation unit 67, the phase difference pixel interpolation unit 69, the display image generation unit 73, the display unit 75, the surrounding pixel value calculation unit 77, a parameter obtaining unit 85, and the estimated gain value calculation unit 87.

The parameter obtaining unit 85 is implemented by the CPU 40 and obtains a gain value estimation parameter that is information for estimating the gain value. For example, in a case where the imaging apparatus 10 is an interchangeable lens camera, communication is performed between a lens side and a body side, and the parameter obtaining unit 85 obtains a gain value estimation parameter for estimating characteristics of a lens and the gain value.

The gain value estimation parameter obtained by the parameter obtaining unit 85 includes at least one of information related to the shape of a lens pupil through which a luminous flux received by the imaging element 16 passes, or information related to incident ray angle characteristics of the phase difference detection pixel and the normal pixel. The gain value is significantly affected by the shape of the lens pupil, and the shape of the lens pupil changes depending on the F-number, the position of the focus lens, and the like. For example, the F-number indicating the state of the stop 14 or the position of the focus lens is used as the information related to the shape of the lens pupil.

The estimated gain value calculation unit 87 calculates the estimated gain value based on the gain value estimation parameter obtained by the parameter obtaining unit 85. For example, the estimated gain value calculation unit 87 calculates the estimated gain value based on the shape of the lens pupil and the incident ray angle characteristics of the phase difference detection pixel and the normal pixel.

A second gain interpolation unit 83 interpolates the pixel value of the phase difference detection pixel of the current frame image using the estimated gain value. That is, in a case where the estimated gain value calculation unit 87 calculates the estimated gain value, the interpolation control unit 79 causes the second gain interpolation unit 83 to perform the interpolation. Accordingly, even in a case where the gain value calculation unit 67 does not calculate the gain value as in the case of the first frame, the gain interpolation is performed on the pixel value of the phase difference detection pixel based on the estimated gain value.

Display Example 3

Next, a display example of the live view image on the liquid crystal monitor 30 in a third embodiment will be described. Like Display Example 1, Display Example 3 is a case where the pixel value of the phase difference detection pixel used in the first frame is interpolated by only the surrounding pixel interpolation.

Figure 15:
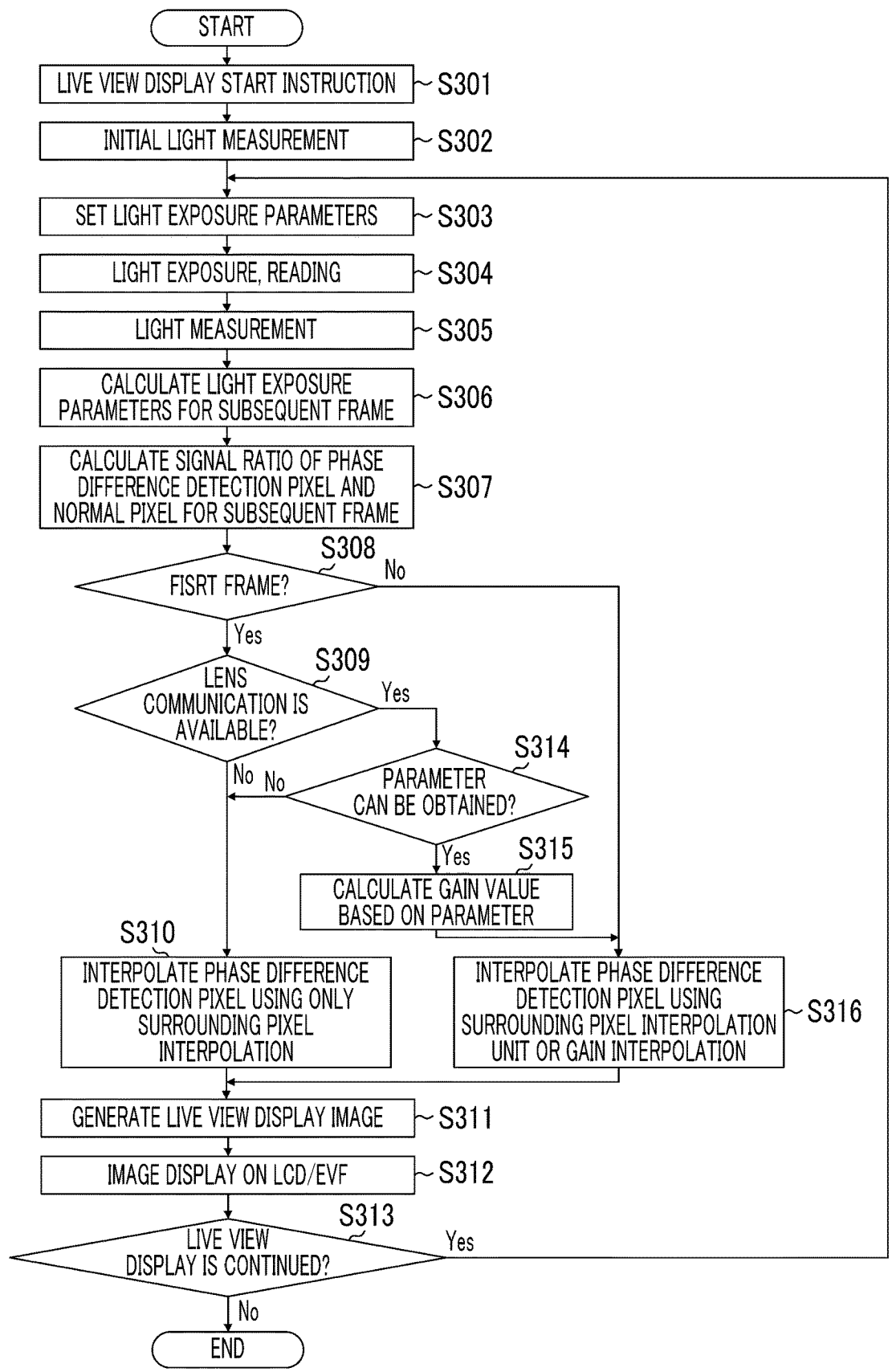
FIG. 15 is a diagram illustrating the display operation flow of the image processing apparatus.

FIG. 15 is a flowchart illustrating a display operation in Display Example 3 of the image processing apparatus 60 of the third embodiment.

First, the live view display start instruction is output by the CPU 40 (step S301). Then, the initial light measurement is performed (step S302), and the light exposure parameters are set (step S303). The light measurement is performed by the light measurement sensor comprised in the imaging apparatus 10. The light exposure parameters are set by the CPU 40.

The light exposure is performed based on the set light exposure parameters, and the interface 63 reads the pixel value from the pixel subjected to the light exposure (step S304). The light measurement is performed (step S305). The light exposure parameters for the subsequent frame are decided by the CPU 40 (step S306). The gain values of the phase difference detection pixel and the normal pixel for the subsequent frame are calculated by the gain value calculation unit 67 (step S307).

Then, the interpolation control unit 79 determines whether or not the current frame is the first frame (step S308). In a case where the current frame is not the first frame, that is, in a case where the gain value calculation unit 67 calculates the gain value, the parameter obtaining unit 85 determines whether or not lens communication is available (step S309).

In a case where the lens communication is not available, the interpolation control unit 79 causes the surrounding pixel interpolation unit 81 to interpolate the pixel value of the phase difference detection pixel (step S310), and the display image generation unit 73 generates the display image (step S311).

In a case where the parameter obtaining unit 85 determines that the lens communication is available (step S309), and the parameter obtaining unit 85 determines that the gain value estimation parameter can be obtained (step S314), the gain value is calculated based on the gain value estimation parameter obtained by the estimated gain value calculation unit 87 (step S315). Then, the interpolation control unit 79 causes the second gain interpolation unit 83 or the surrounding pixel interpolation unit 81 to interpose the pixel value of the phase difference detection pixel (step S316) and causes the display image generation unit 73 to generate the display image (step S311).

Then, the generated display image is displayed on the liquid crystal monitor 30 or the EVF by the display unit 75 (step S312).

Then, for example, the CPU 40 determines whether or not to continue the live view display (step S313). In the case of continuing the live view display, the light exposure parameters are set based on the calculated light exposure parameters. In the case of not continuing the live view display, the flow is finished.

Display Example 4

Next, a display example of the live view image on the liquid crystal monitor 30 in the third embodiment will be described. In Display Example 4, the gain value is not calculated in the first frame image, and the gain interpolation cannot be performed on the first frame image. Thus, the first frame image is not displayed.

In a case where the communication between the camera body and the lens is not available in a case where a third-party lens is mounted or due to any reason, or in a case where the communication is available but the parameter necessary for estimating the gain value is not stored on the lens side, the estimated gain value calculation unit 87 cannot calculate the estimated gain value. In such a case, the first frame image is not displayed. That is, in a case where the parameter obtaining unit 85 does not obtain the gain value estimation parameter, the display image generation unit 73 generates the display image of only the current frame image.

Figure 16:
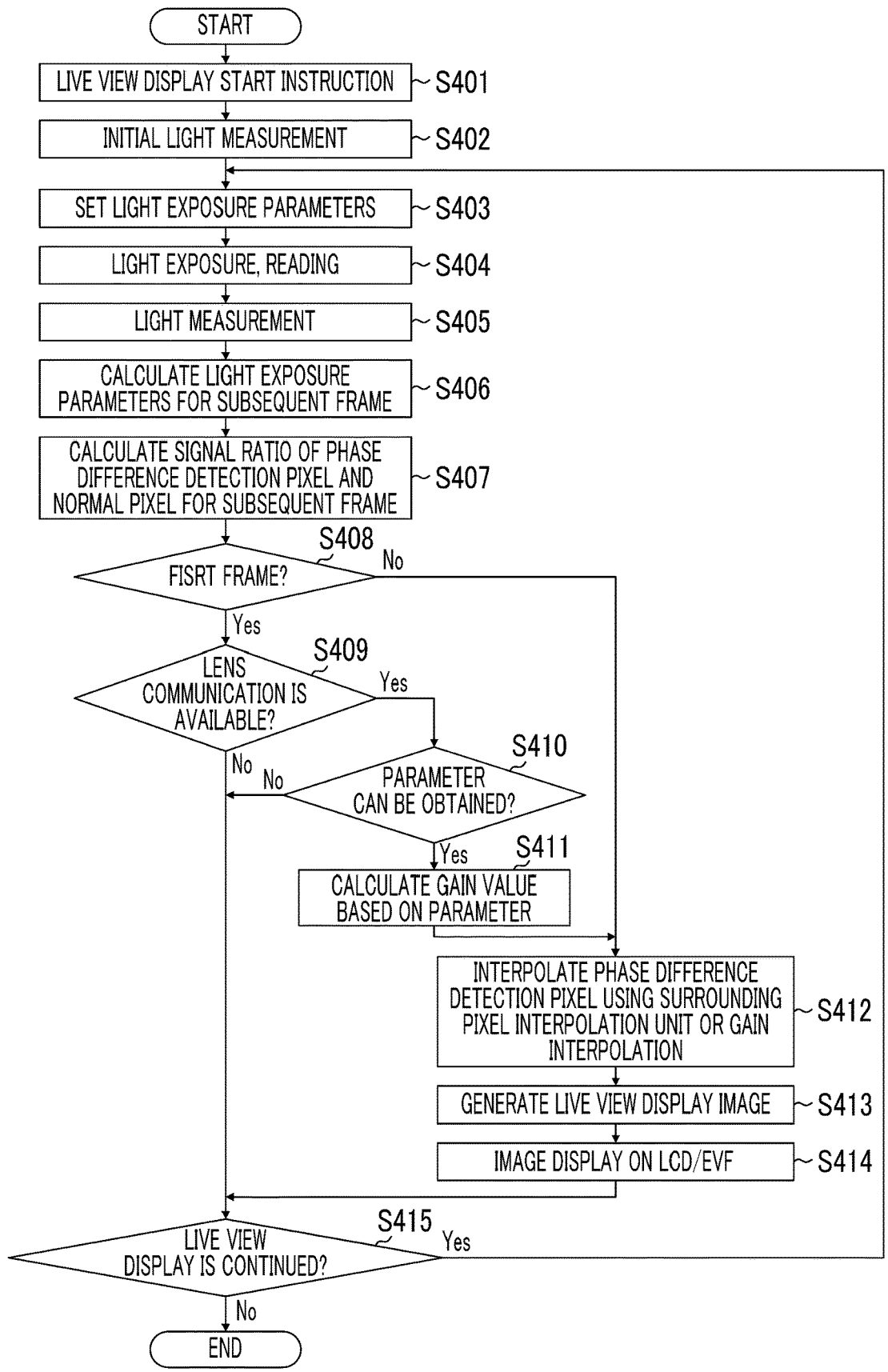
FIG. 16 is a diagram illustrating the display operation flow of the image processing apparatus.

FIG. 16 is a flowchart illustrating a display operation in Display Example 4 of the image processing apparatus 60 of the third embodiment.

First, the live view display start instruction is output by the CPU 40 (step S401). Then, the initial light measurement is performed (step S402), and the light exposure parameters are set (step S403). The light measurement is performed by the light measurement sensor comprised in the imaging apparatus 10. The light exposure parameters are set by the CPU 40.

The light exposure is performed based on the set light exposure parameters, and the interface 63 reads the pixel value from the pixel subjected to the light exposure (step S404). The light measurement is performed (step S405). The light exposure parameters for the subsequent frame are decided by the CPU 40 (step S406). The gain values of the phase difference detection pixel and the normal pixel for the subsequent frame are calculated by the gain value calculation unit 67 (step S407).

Then, the interpolation control unit 79 determines whether or not the current frame is the first frame (step S408). In a case where the current frame is not the first frame, that is, in a case where the gain value calculation unit 67 calculates the gain value, the parameter obtaining unit 85 determines whether or not lens communication is available (step S409).

In a case where the lens communication is not available, the display image corresponding to the first frame is not generated.

In a case where the parameter obtaining unit 85 determines that the lens communication is available (step S409), and the parameter obtaining unit 85 determines that the gain value estimation parameter can be obtained (step S410), the gain value is calculated based on the gain value estimation parameter obtained by the estimated gain value calculation unit 87 (step S411). Then, the interpolation control unit 79 causes the second gain interpolation unit 83 or the surrounding pixel interpolation unit 81 to interpolate the pixel value of the phase detection pixel (step S412) and causes the display image generation unit 73 to generate the display image (step S413).

Then, the generated display image is displayed on the liquid crystal monitor 30 or the EVF by the display unit 75 (step S414).

Then, for example, the CPU 40 determines whether or not to continue the live view display (step S415). In the case of continuing the live view display, the light exposure parameters are set based on the calculated light exposure parameters. In the case of not continuing the live view display, the flow is finished.

Fourth Embodiment

Next, a fourth embodiment of the present invention will be described. In the present embodiment, the pixel value of the phase difference detection pixel is interpolated depending on the amount of change in imaging condition between frames.

Figure 17:
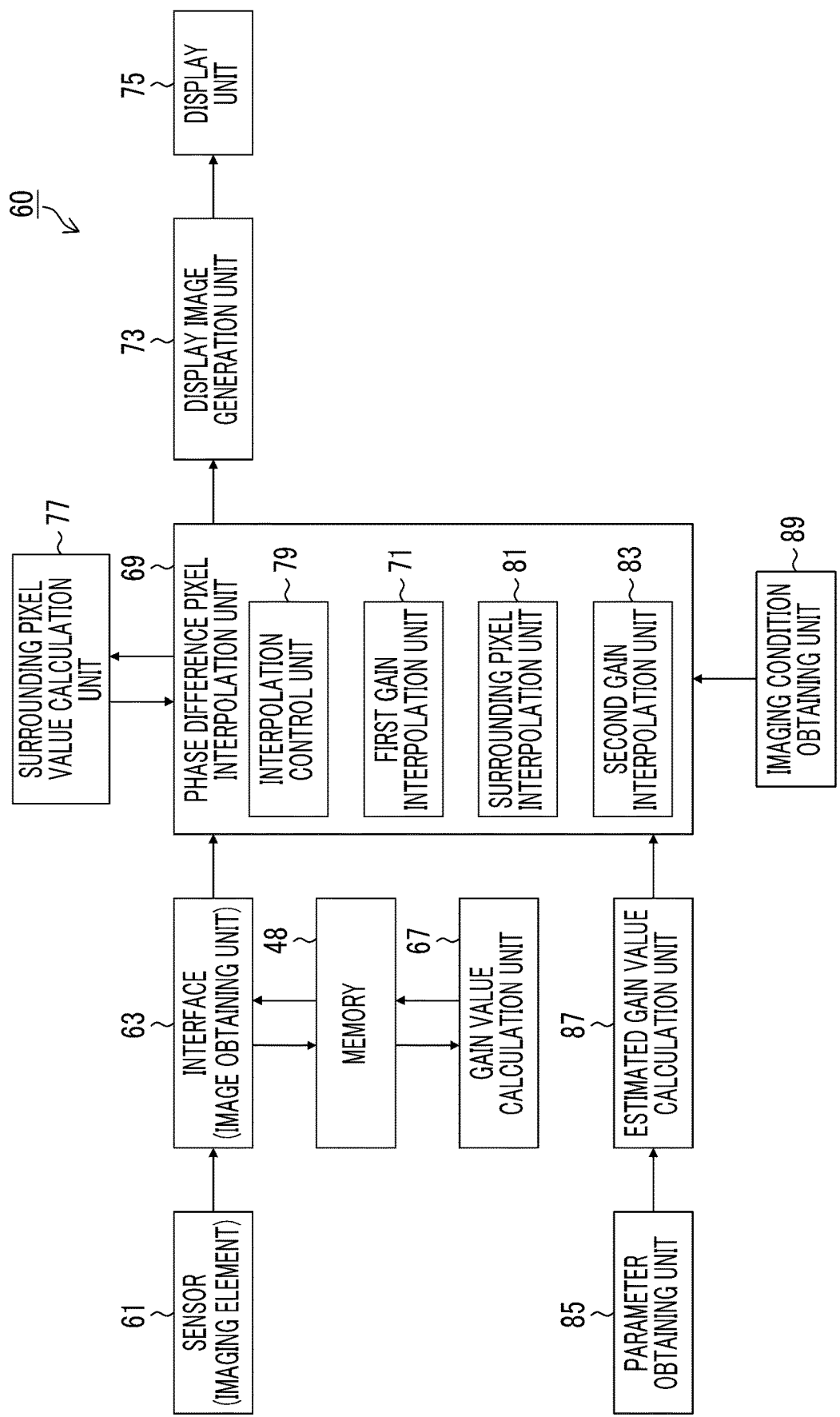
FIG. 17 is a block diagram illustrating a functional configuration example of the image processing apparatus.

FIG. 17 is a block diagram illustrating a functional configuration example of the image processing apparatus 60 of the present embodiment. Parts already described in FIG. 7 will be designated by the same reference signs, and descriptions of such parts will not be repeated.

The image processing apparatus 60 of the present embodiment is configured with the sensor 61, the interface 63, the memory 48, the gain value calculation unit 67, the phase difference pixel interpolation unit 69, the display image generation unit 73, the display unit 75, the surrounding pixel value calculation unit 77, the parameter obtaining unit 85, the estimated gain value calculation unit 87, and an imaging condition obtaining unit 89.

The imaging condition obtaining unit 89 is implemented by the CPU 40 and obtains information related to the imaging condition for the current frame image and the past frame image. For example, the imaging condition obtaining unit 89 obtains information related to the stop 14 of the optical system through which the luminous flux received by the imaging element 16 passes.

In a case where the amount of change in information related to the imaging condition is greater than or equal to a threshold in the current frame image and the past frame image, the interpolation control unit 79 causes the surrounding pixel interpolation unit 81 to perform the interpolation. For example, the interpolation control unit 79 performs control as follows. In a case where the F-number significantly changes between the past frame image and the current frame image in order to follow the light exposure, the gain interpolation cannot be performed using the gain value of the past frame. In such a case, it is desirable to perform the phase difference pixel interpolation using only the surrounding pixel interpolation. Thus, for example, in a case where the amount of change calculated using a pupil diameter r1 at the time of the light exposure of the past frame and a pupil diameter r2 at the time of the light exposure of the current frame and a predetermined threshold th satisfy the condition in (Expression 3) below, the interpolation control unit 79 determines that the change in shape of the pupil is significant and causes the surrounding pixel interpolation unit 81 to perform the interpolation.

$$|1-(r1/r2)|>th \qquad \text{(Expression 3)}$$

Display Example 5

Figure 18:
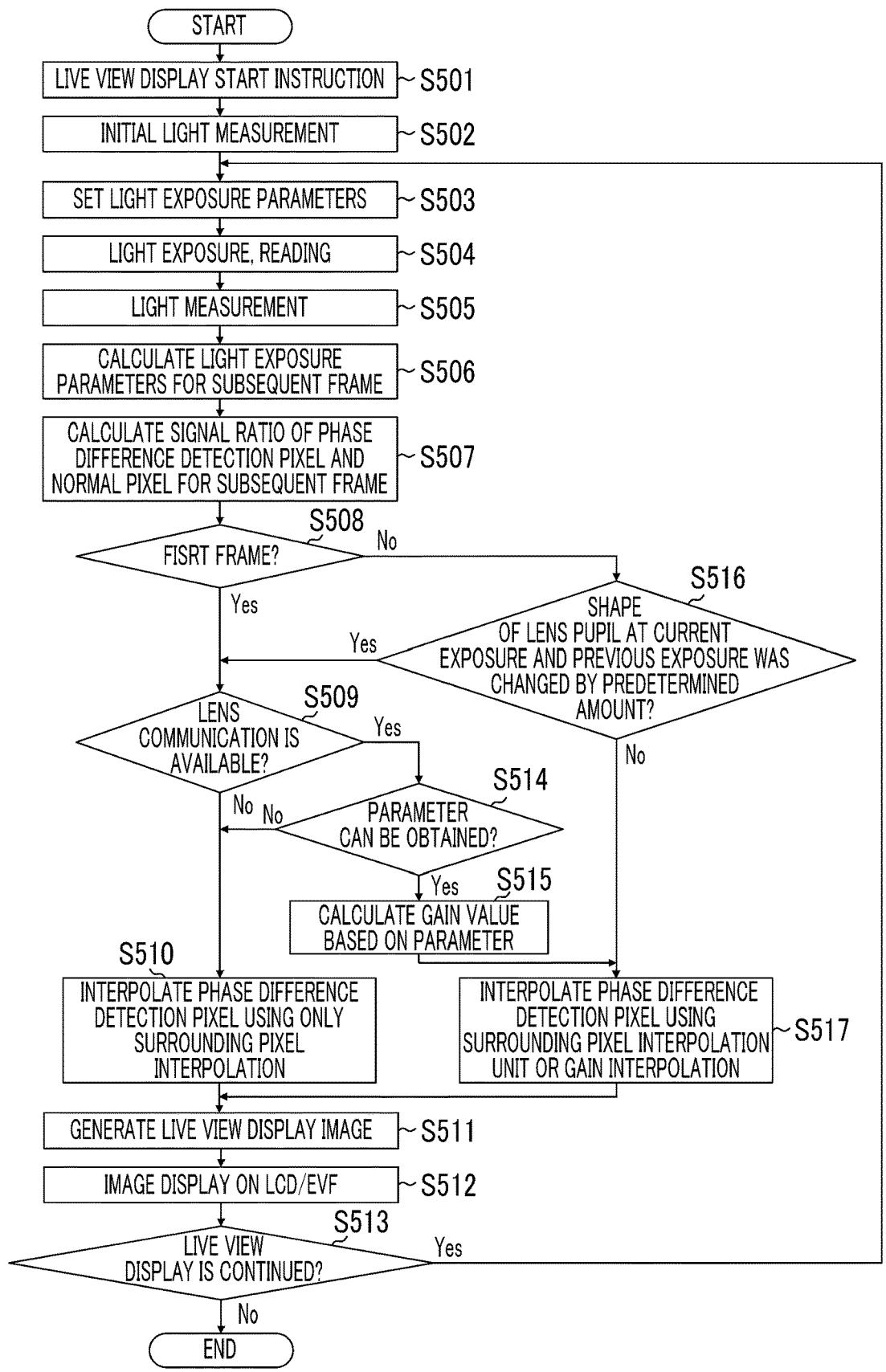
FIG. 18 is a diagram illustrating the display operation flow of the image processing apparatus.

FIG. 18 is a flowchart illustrating a display operation in Display Example 5 of the image processing apparatus 60 of the fourth embodiment.

First, the live view display start instruction is output by the CPU 40 (step S501). Then, the initial light measurement is performed (step S502), and the light exposure parameters are set (step S503). The light measurement is performed by the light measurement sensor comprised in the imaging apparatus 10. The light exposure parameters are set by the CPU 40.

The light exposure is performed based on the set light exposure parameters, and the interface 63 reads the pixel value from the pixel subjected to the light exposure (step S504). The light measurement is performed (step S505). The light exposure parameters for the subsequent frame are decided by the CPU 40 (step S506). The gain values of the phase difference detection pixel and the normal pixel for the subsequent frame are calculated by the gain value calculation unit 67 (step S507).

Then, the interpolation control unit 79 determines whether or not the current frame is the first frame (step S508). In a case where the current frame is not the first frame, that is, in a case where the gain value calculation unit 67 calculates the gain value, the imaging condition obtaining unit 89 obtains the information related to the imaging condition for the current frame image and the past frame image, and the interpolation control unit 79 determines whether or not the amount of change is greater than the threshold (step S516). In a case where the amount of change is greater than or equal to the threshold, the gain value calculated based on the past frame image cannot be used in the gain interpolation of the current frame. Thus, the parameter obtaining unit 85 determines whether or not the lens communication is available (step S509). In a case where the amount of change is less than or equal to the threshold, the gain value calculated based on the past frame image can be used in the gain interpolation of the current frame. Thus, the interpolation is performed using the calculated gain value.

In a case where the lens communication is not available, the interpolation control unit 79 causes the surrounding pixel interpolation unit 81 to interpolate the pixel value of the phase difference detection pixel (step S510), and the display image generation unit 73 generates the display image (step S511).

Then, the generated display image is displayed on the liquid crystal monitor 30 or the EVF by the display unit 75 (step S512).

Then, for example, the CPU 40 determines whether or not to continue the live view display (step S513). In the case of continuing the live view display, the light exposure parameters are set based on the calculated light exposure parameters. In the case of not continuing the live view display, the flow is finished.

In a case where the parameter obtaining unit 85 determines that the lens communication is available (step S509), and the parameter obtaining unit 85 determines that the gain value estimation parameter can be obtained (step S514), the gain value is calculated based on the gain value estimation parameter obtained by the estimated gain value calculation unit 87 (step S515). Then, the interpolation control unit 79 causes the second gain interpolation unit 83 or the surrounding pixel interpolation unit 81 to interpolate the pixel value of the phase detection pixel (step S517) and causes the display image generation unit 73 to generate the display image (step S511).

Other Examples

Next, other examples of the present invention will be described. While the example of the rolling shutter type is described in the above description, an example of a global shutter type will be described in the present example.

Figure 19:
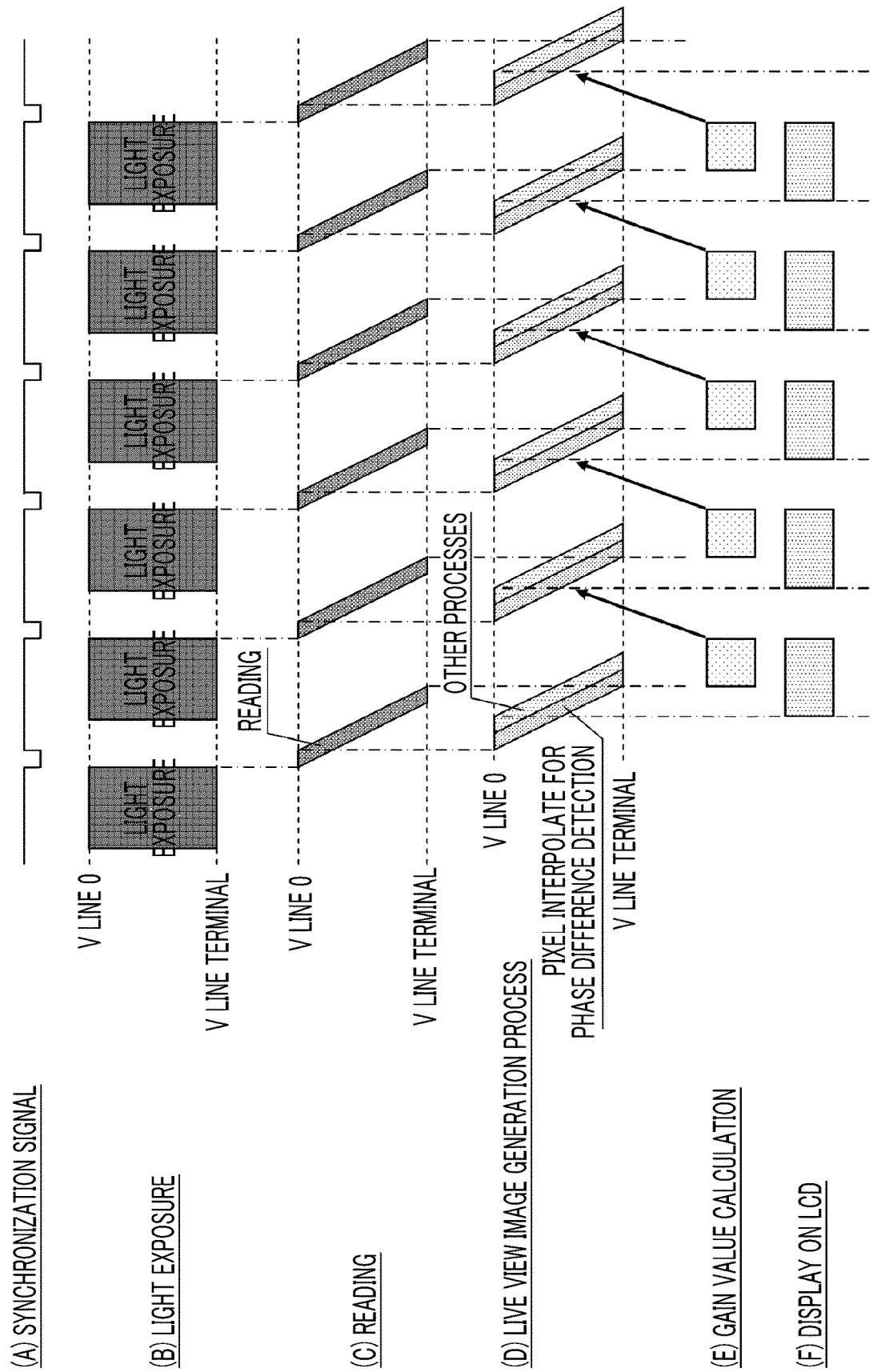
FIG. 19 is a sequence diagram from the light exposure to the display of the image.

FIG. 19 is a sequence diagram obtained by adding the timing of the gain value calculation to the sequence diagram of the light exposure of the imaging element 16 to the display of the image like FIG. 9. The sequence diagram in FIG. 19 is different from the sequence diagram in FIG. 9 in that the pixel value is read using the global shutter type.

In the sensor 61 of the global shutter type, the light exposure of all lines (all pixels) is started at the same time and is completed at the same time unlike the sensor 61 of the rolling shutter type (FIG. 19(B)). However, after the light exposure is completed, the reading of the accumulated signal and transfer of the signal to the ASIC are performed by sequential transfer from the first line. The reading (FIG. 19(C)), transfer, and the subsequent processing sequences are the same as those in the case of the rolling shutter type (FIG. 10).

That is, the interpolation of the pixel value of the phase difference detection pixel and other processes are performed from the pixel value of the line in which the reading is finished. In addition, for example, the pixel value of the phase difference detection pixel in the first frame image is interpolated by the surrounding pixel interpolation unit 81 (FIG. 19(D)). In addition, the gain value is calculated by the gain value calculation unit 67. However, the calculated gain value is used in the subsequent frame image (FIG. 19(E)).

In FIG. 19, the timing of reading the pixel data overlaps with the timing of the subsequent light exposure. That is, the light exposure and the reading are performed in parallel. In the case of the sensor 61 of the global shutter type, an accumulation unit (not illustrated) that accumulates signals retained in the photodiode is comprised in all pixels separately from the photodiode in which charges are retained during the light exposure. After the light exposure is completed, the signals retained in all photodiodes are moved to the accumulation units. The signals of the accumulation units are sequentially read and transferred to the ASIC. Accordingly, in a case where the signals are moved to the accumulation units, the photodiodes enter a state free of signals. Thus, the subsequent light exposure can be started.

Example of Smartphone

Figure 20:
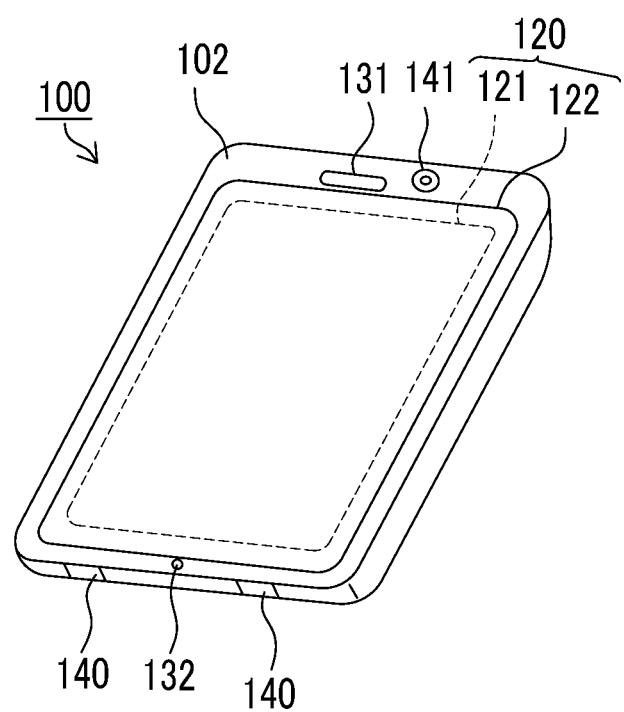
FIG. 20 is a diagram illustrating an exterior of a smartphone as one embodiment of the imaging apparatus.

FIG. 20 is a diagram illustrating an exterior of a smartphone as one embodiment of the imaging apparatus 10.

A smartphone 100 illustrated in FIG. 20 includes a casing 102 having a flat plate shape. A display and input unit 120 in which a display panel 121 as a display unit and an operation panel 122 as an input unit are formed as a single unit is disposed on one surface of the casing 102. In addition, the casing 102 comprises a speaker 131, a microphone 132, an operation unit 104, and a camera unit 141 (imaging unit).

The configuration of the casing 102 is not limited thereto and, for example, can employ a configuration in which a display unit and an input unit are independently disposed or employ a configuration that has a folding structure or a sliding mechanism.

Figure 21:
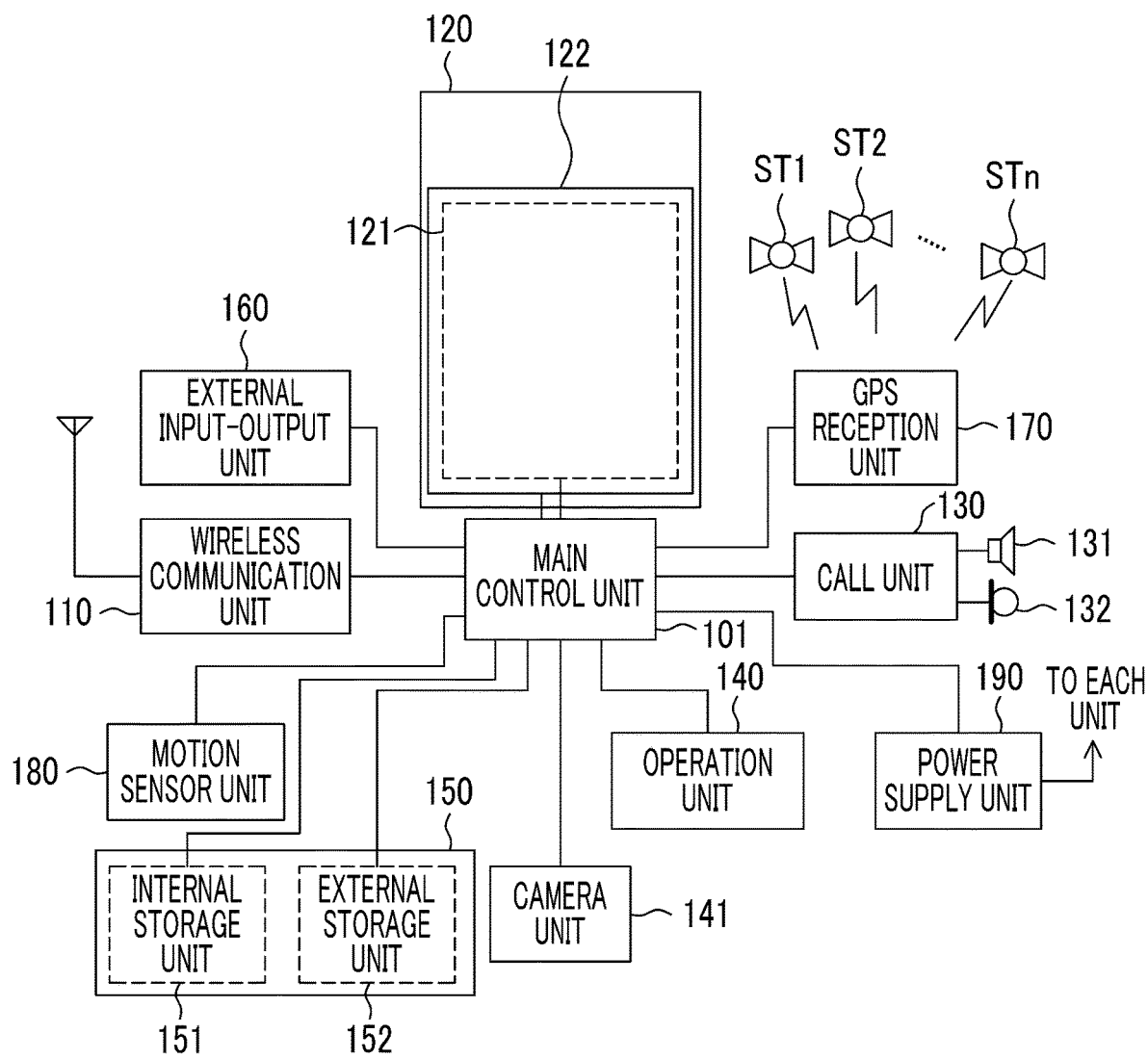
FIG. 21 is a block diagram illustrating an internal configuration of the smartphone illustrated in FIG. 20.

FIG. 21 is a block diagram illustrating an internal configuration of the smartphone 100 illustrated in FIG. 20. As illustrated in FIG. 21, main constituents of the smartphone 100 comprise a wireless communication unit 110, the display and input unit 120, a call unit 130, the operation unit 140, the camera unit 141, a storage unit 150, an external input-output unit 160 (output unit), a global positioning system (GPS) reception unit 170, a motion sensor unit 180, a power supply unit 190, and a main control unit 101. In addition, a main function of the smartphone 100 includes a wireless communication function of performing mobile wireless communication with a base station apparatus through a mobile communication network.

The wireless communication unit 110 performs wireless communication with the base station apparatus connected to the mobile communication network in accordance with an instruction from the main control unit 101. By using the wireless communication, transmission and reception of various file data such as voice data and image data, electronic mail data, and the like and reception of web data, streaming data, and the like are performed.

The display and input unit 120 is a so-called touch panel comprising the operation panel 122 arranged on the screen of the display panel 121. The display and input unit 120 visually delivers information to the user by displaying images (still image and motion image), text information, and the like and detects a user operation performed on the displayed information under control of the main control unit 101. The operation panel 122 is referred to as a touch panel for convenience.

The display panel 121 uses a liquid crystal display (LCD), an organic electro-luminescence display (OELD), or the like as a display device. The operation panel 122 is a device that is disposed in a state where the image displayed on the display surface of the display panel 121 can be visually recognized, and detects one or a plurality of coordinates operated by a finger of the user or a stylus. In a case where the device is operated by the finger of the user or the stylus, the operation panel 122 outputs a detection signal generated by the operation to the main control unit 101. Next, the main control unit 101 detects the operation position (coordinates) on the display panel 121 based on the received detection signal.

The display panel 121 and the operation panel 122 of the smartphone 100 illustrated in FIG. 20 constitute the display and input unit 120 as a single unit. The operation panel 122 is arranged to completely cover the display panel 121. In the case of employing such an arrangement, the operation panel 122 may have a function of detecting the user operation even in a region outside the display panel 121. In other words, the operation panel 122 may comprise a detection region (hereinafter, referred to as a "display region") for an overlapping part in overlap with the display panel 121 and a display region (hereinafter, referred to as a "non-display region") for the other peripheral part not in overlap with the display panel 121.

The size of the display area may completely match the size of the display panel 121, but both sizes may not necessarily match. In addition, the operation panel 122 may comprise two sensitive regions including the peripheral part and the other inner part. Furthermore, the width of the peripheral part is appropriately designed according to the size or the like of the casing 102. Furthermore, a position detection method employed in the operation panel 122 is exemplified by a matrix switch method, a resistive film method, a surface acoustic wave method, an infrared method, an electromagnetic induction method, an electrostatic capacitive method, and the like. Any method may be employed.

The call unit 130 comprises the speaker 131 and the microphone 132. The call unit 130 converts the voice of the user input through the microphone 132 into voice data processable in the main control unit 101 and outputs the voice data to the main control unit 101, or decodes the voice data received by the wireless communication unit 110 or the external input-output unit 160 and outputs the decoded voice data from the speaker 131. In addition, as illustrated in FIG. 20, for example, the speaker 131 and the microphone 132 can be mounted on the same surface as the surface on which the display and input unit 120 is disposed.

The operation unit 140 is a hardware key using a key switch or the like and receives an instruction from the user. For example, as illustrated in FIG. 20, the operation unit 140 is a push-button type switch that is mounted on a side surface of the casing 102 of the smartphone 100. In a case where the operation unit 140 is pressed by the finger or the like, the operation unit 140 enters a switch ON state. In a case where the finger is released, the operation unit 140 enters a switch OFF state by a restoring force of a spring or the like.

The storage unit 150 stores a control program and control data of the main control unit 101, address data in which a name, a telephone number, and the like of a communication counterpart are associated, data of transmitted and received electronic mails, web data downloaded by web browsing, downloaded contents data, and the like and also temporarily stores streaming data and the like.

In addition, the storage unit 150 is configured with an internal storage unit 151 incorporated in the smartphone and an external storage unit 152 including a slot for detachable external memory. Each of the internal storage unit 151 and the external storage unit 152 constituting the storage unit 150 is implemented using a storage medium such as a memory of a flash memory type, a hard disk type, a multimedia card micro type, or a card type, a random access memory (RAM), or a ROM.

The external input-output unit 160 acts as an interface for all external apparatuses connected to the smartphone 100 and is directly or indirectly connected to other external apparatuses by communication and the like (for example, Universal Serial Bus (USB) and IEEE 1394) or networks (for example, a wireless local area network (LAN), Bluetooth (registered trademark), radio frequency identification (RFID), infrared data association (IrDA), Ultra Wideband (UWB) (registered trademark), and ZigBee (registered trademark)).

For example, the externa apparatuses connected to the smartphone 100 include a wired/wireless headset, a wired/wireless external charger, a wired/wireless data port, a memory card or a subscriber identity module (SIM)/user identity module card (UIM) card connected through a card socket, an external audio and video apparatus connected through an audio and video input/output (I/O), an external audio and video apparatus connected in a wired/wireless manner, a smartphone, a personal computer, a personal digital assistant (PDA), and an earphone. The external input-output unit 160 may be configured to deliver data transferred from the external apparatuses to each constituent inside the smartphone 100 or transfer data inside the smartphone 100 to the external apparatuses.

The GPS reception unit 170 receives GPS signals transmitted from GPS satellites ST1, ST2 to STn, executes a position measurement calculation process based on the plurality of received GPS signals, and obtains positional information (GPS information) specified by the latitude, the longitude, and the altitude of the smartphone 100 in accordance with an instruction from the main control unit 101. In a case where the positional information can be obtained from the wireless communication unit 110 and/or the external input-output unit 160 (for example, a wireless LAN), the GPS reception unit 170 can detect the position using the positional information.

The motion sensor unit 180 comprises, for example, a three-axis acceleration sensor and detects a physical motion of the smartphone 100 in accordance with an instruction from the main control unit 101. By detecting the physical motion of the smartphone 100, the movement direction and the acceleration of the smartphone 100 are detected. The result of the detection is output to the main control unit 101.

The power supply unit 190 supplies power stored in a battery (not illustrated) to each unit of the smartphone 100 in accordance with an instruction from the main control unit 101.

The main control unit 101 comprises a microprocessor, operates in accordance with the control program and the control data stored in the storage unit 150, and manages and controls each unit of the smartphone 100. In addition, the main control unit 101 has a mobile communication control function of controlling each unit of a communication system and an application processing function in order to perform voice communication and data communication through the wireless communication unit 110.

The application processing function is implemented by operating the main control unit 101 in accordance with application software stored in the storage unit 150. For example, the application processing function includes an infrared communication function of performing data communication with an opposing apparatus by controlling the external input-output unit 160, an electronic mail function of transmitting and receiving electronic mails, and a web browsing function of browsing web pages, and also includes an image processing function according to the embodiment of the present invention.

In addition, the main control unit 101 has the image processing function such as displaying a video on the display and input unit 120 based on image data (data of a still image or a motion image) such as reception data and downloaded streaming data. In addition, the image processing function includes image processing performed by the image processing unit 24 illustrated in FIG. 3.

The main control unit 101 executes a display control for the display panel 121 and an operation detection control of detecting a user operation performed through the operating unit 140 or the operation panel 122.

By executing the display control, the main control unit 101 displays an icon for starting the application software or a software key such as a scroll bar, or displays a window for composing an electronic mail. The scroll bar refers to a software key for receiving an instruction to move a displayed part of an image for a large image or the like that does not fit in the display area of the display panel 121.

In addition, by executing the operation detection control, the main control unit 101 detects the user operation performed through the operation unit 140, receives an operation performed on the icon through the operation panel 122 or an input of a text string in an input field of the window, or receives a request for scrolling the display image through the scroll bar.

Furthermore, the main control unit 101 includes a touch panel control function that, by execution of the operation detection control, determines whether the position of an operation performed for the operation panel 122 corresponds to the overlaying part (display area) overlaying the display panel 121 or corresponds to the peripheral part (non-display area) other than the overlaying part not overlaying the display panel 121 and that controls the displayed position of the responsive area of the operation panel 122 or the software key.

In addition, the main control unit 101 can detect a gesture operation performed on the operation panel 122 and execute a present function depending on the detected gesture operation. The gesture operation is not a simple touch operation in the related art and means an operation of drawing a trajectory by the finger or the like, specifying a plurality of positions at the same time, or an operation of a combination thereof by drawing a trajectory from at least one of the plurality of positions.

The camera unit 141 converts the image data obtained by imaging into compressed image data in, for example, joint photographic experts group (JPEG) and records the image data in the storage unit 150 or outputs the image data through the external input-output unit 160 or the wireless communication unit 110 under control of the main control unit 101. As illustrated in FIG. 20, in the smartphone 100, the camera unit 141 is mounted on the same surface as the display and input unit 120. However, the mounting position of the camera unit 141 is not for limitation purposes, and the camera unit 141 may not be mounted on the side surface of the casing 102 on which the display and input unit 120 is disposed. The camera unit 141 may be mounted on the rear surface of the casing 102, or a plurality of camera units 141 may be mounted on the casing 102. In a case where the plurality of camera units 141 are mounted, imaging may be performed by a single camera unit 141 by switching the camera unit 141 performing the imaging, or imaging may be performed using the plurality of camera units 141 at the same time.

In addition, the camera unit 141 can be used in various functions of the smartphone 100. For example, the image obtained by the camera unit 141 may be displayed on the display panel 121, or the image captured and obtained in the camera unit 141 may be used as one of operation input methods for the operation panel 122. In addition, in the detection of the position by the GPS reception unit 170, the position may be detected with reference to the image from the camera unit 141. Furthermore, determination of the direction of the optical axis of the camera unit 141 of the smartphone 100 or determination of the current usage environment can be performed by referencing the image from the camera unit 141 without using the three-axis acceleration sensor or with use of the three-axis acceleration sensor. The image from the camera unit 141 can also be used in the application software.

Besides, data obtained by adding the positional information obtained by the GPS reception unit 170, voice information (may be text information obtained by performing voice-to-text conversion by the main control unit or the like) obtained by the microphone 132, attitude information obtained by the motion sensor unit 180, and the like to the image data of the still picture or the motion picture can be recorded in the storage unit 150 or output through the external input-output unit 160 or the wireless communication unit 110.

While examples of the present invention are described thus far, the present invention is not limited to the embodiments described above. Various modifications can be made without departing from the spirit of the present invention.

EXPLANATION OF REFERENCES

1: strobe
2: shutter button
3: power supply and/or mode switch
4: mode dial
5: zoom button
6: cross button
7: MENU/OK button
8: playback button
9: BACK button
10: imaging apparatus
12: imaging lens
14: stop
15: mechanical shutter
16: imaging element
16A: light shielding member
16B: light shielding member
22: image input controller
24: image processing unit
26: compression/expansion processing unit
28: video encoder
30: liquid crystal monitor
32: sensor drive unit
33: shutter drive unit
34: stop drive unit
36: lens drive unit
38: operation unit
40: CPU
42: AF processing unit
44: AE detection unit
47: ROM
48: memory
50: VRAM
52: media controller
54: memory card
60: image processing apparatus
61: sensor
63: interface
67: gain value calculation unit
69: phase difference pixel interpolation unit
71: first gain interpolation unit
73: display image generation unit
75: display unit
77: surrounding pixel value calculation unit
79: interpolation control unit
81: surrounding pixel interpolation unit
83: second gain interpolation unit
85: parameter obtaining unit
87: estimated gain value calculation unit
89: imaging condition obtaining unit
100: smartphone
101: main control unit
102: casing
110: wireless communication unit
120: display and input unit
121: display panel
122: operation panel
130: call unit
131: speaker
132: microphone
140: operation unit
141: camera unit
150: storage unit
151: internal storage unit
152: external storage unit
160: external input-output unit
170: GPS reception unit
180: motion sensor unit
190: power supply unit
S101 to S113: image processing step illustrating Display Example 1
S201 to S212: image processing step illustrating Display Example 2
S301 to S316: image processing step illustrating Display Example 3
S401 to S415: image processing step illustrating Display Example 4
S501 to S517: image processing step illustrating Display Example 5

What is claimed is:

1. An image processing apparatus comprising:
a sensor in which a plurality of phase difference detection pixels and a plurality of normal pixels are two-dimensionally arranged;
an interface that sequentially obtains each frame image in time series order of the motion picture from the sensor during imaging of the motion picture, the frame image having pixel values of the plurality of phase difference detection pixels and pixel values of the plurality of normal pixels;
a gain value calculator that calculates a gain value to be used in gain interpolation of the pixel value of the phase difference detection pixel of a current frame image based on the phase difference detection pixels and the normal pixels which are surrounded by the phase difference detection pixels in a past frame image in the time series order obtained by the interface;
a first gain interpolator that interpolates the pixel value of the phase difference detection pixel of the current frame image using the gain value; and
a display image generator that generates a display image of the current frame image based on the pixel value of the phase difference detection pixel of the current frame image interpolated by the first gain interpolator and the pixel value of the normal pixel.

2. The image processing apparatus according to claim 1, further comprising:
a surrounding pixel value calculator that calculates a surrounding pixel value based on the pixel value of the normal pixel in a surrounding region of the phase difference detection pixel of the current frame image; and
a surrounding pixel interpolator that interpolates the pixel value of the phase difference detection pixel of the current frame image using the surrounding pixel value.

3. The image processing apparatus according to claim 2, further comprising:
an interpolation controller that controls operation of the first gain interpolator and the surrounding pixel interpolator,
wherein the interpolation controller causes the first gain interpolator to perform the interpolation in a case where the gain value calculator calculates the gain value, and causes the surrounding pixel interpolator to perform the interpolation in a case where the gain value calculator does not calculate the gain value.

4. The image processing apparatus according to claim 3, wherein in a case where the gain value calculator does not calculate the gain value, the display image generator does not generate the display image of the current frame image.

5. The image processing apparatus according to claim 3, further comprising:
a processor that obtains a gain value estimation parameter which is information for estimating the gain value;
an estimated gain value calculator that calculates an estimated gain value based on the gain value estimation parameter obtained by the processor; and
a second gain interpolator that interpolates the pixel value of the phase difference detection pixel of the current frame image using the estimated gain value,
wherein in a case where the estimated gain value calculator calculates the estimated gain value, the interpolation controller causes the second gain interpolator to perform the interpolation.

6. The image processing apparatus according to claim 5, wherein in a case where the processor does not obtain the gain value estimation parameter, the display image generator does not generate the display image of the current frame image.

7. The image processing apparatus according to claim 5, wherein the gain value estimation parameter obtained by the processor includes at least one of information related to a shape of a lens pupil through which a luminous flux received by the sensor passes, or information related to incident ray angle characteristics of the phase difference detection pixel and the normal pixel.

8. The image processing apparatus according to claim 3, further comprising:
a processor that obtains information related to an imaging condition for the current frame image and the past frame image,
wherein in a case where an amount of change in information related to the imaging condition between the current frame image and the past frame image is greater than or equal to a threshold, the interpolation controller causes the surrounding pixel interpolator to perform the interpolation.

9. The image processing apparatus according to claim 1, wherein the gain value calculator calculates the gain value by calculating a signal ratio of the phase difference detection pixel and the normal pixel of a plurality of the past frame images.

10. The image processing apparatus according to claim 1, wherein the sensor is of a rolling shutter type or a global shutter type.

11. The image processing apparatus according to claim 1, further comprising:
a displayer that displays the display image generated by the display image generator.

12. An image processing method comprising:
a step of causing a sensor in which a plurality of phase difference detection pixels and a plurality of normal pixels are two-dimensionally arranged to sequentially obtain each frame image in time series order of the motion picture from the sensor during imaging of the motion picture, the frame image having pixel values of the plurality of phase difference detection pixels and pixel values of the plurality of normal pixels;
a step of calculating a gain value to be used in gain interpolation of the pixel value of the phase difference detection pixel of a current frame image based on the phase difference detection pixels and the normal pixels which are surrounded by the phase difference detection pixels in the obtained past frame image in the time series order;
a step of interpolating the pixel value of the phase difference detection pixel of the current frame image using the gain value; and
a step of generating a display image of the current frame image based on the interpolated pixel value of the phase difference detection pixel of the current frame image and the pixel value of the normal pixel.

13. The image processing method according to claim 12, further comprising:
a step of calculating a surrounding pixel value based on the pixel value of the normal pixel in a surrounding region of the phase difference detection pixel of the current frame image; and
a step of interpolating the pixel value of the phase difference detection pixel of the current frame image using the surrounding pixel value.

14. The image processing method according to claim 13, further comprising:
a step of controlling operation of a first gain interpolator that interpolates the pixel value of the phase difference detection pixel of the current frame image using the gain value and a surrounding pixel interpolator that interpolates the pixel value of the phase difference detection pixel of the current frame image using the surrounding pixel value, and causing the first gain interpolator to perform the interpolation in a case where the gain value is calculated, and causing the surrounding pixel interpolator to perform the interpolation in a case where the gain value is not calculated.

15. A non-transitory, computer-readable tangible recording medium which records a program for causing a computer to execute:
a step of causing a sensor in which a plurality of phase difference detection pixels and a plurality of normal pixels are two-dimensionally arranged to sequentially obtain each frame image in time series order of the motion picture from the sensor during imaging of the motion picture, the frame image having pixel values of the plurality of phase difference detection pixels and pixel values of the plurality of normal pixels;
a step of calculating a gain value to be used in gain interpolation of the pixel value of the phase difference detection pixel of a current frame image based on the phase difference detection pixels and the normal pixels which are surrounded by the phase difference detection pixels in the obtained past frame image in the time series order;
a step of interpolating the pixel value of the phase difference detection pixel of the current frame image using the gain value; and
a step of generating a display image of the current frame image based on the interpolated pixel value of the phase difference detection pixel of the current frame image and the pixel value of the normal pixel.

* * * * *